US012641211B2

(12) United States Patent
Huang et al.

(10) Patent No.: US 12,641,211 B2
(45) Date of Patent: May 26, 2026

(54) SYSTEM AND METHOD OF IMAGE RENDERING QUALITY PREDICTION AND PATH PLANNING FOR LARGE-SCALE SCENES, AND COMPUTER DEVICE

(71) Applicant: Shenzhen University, Guangdong (CN)

(72) Inventors: Hui Huang, Shenzhen (CN); Zimu Yi, Shenzhen (CN)

(73) Assignee: SHENZHEN UNIVERSITY, Guangdong (CN)

( * ) Notice: Subject to any disclaimer, the term of this patent is extended or adjusted under 35 U.S.C. 154(b) by 289 days.

(21) Appl. No.: 18/350,603

(22) Filed: Jul. 11, 2023

(65) Prior Publication Data

US 2024/0031550 A1 Jan. 25, 2024

(30) Foreign Application Priority Data

Jul. 25, 2022 (CN) .......................... 202210875075.9

(51) Int. Cl.
*H04N 13/279* (2018.01)
*G06T 15/06* (2011.01)
*G06V 10/74* (2022.01)

(52) U.S. Cl.
CPC ........... *H04N 13/279* (2018.05); *G06T 15/06* (2013.01); *G06V 10/761* (2022.01)

(58) Field of Classification Search
CPC ..... H04N 13/279; G06V 10/761; G06T 15/06
See application file for complete search history.

(56) References Cited

U.S. PATENT DOCUMENTS

| | | | | |
|---|---|---|---|---|
| 5,696,892 | A | * 12/1997 | Redmann | ................ G06T 13/20 348/E5.022 |
| 6,335,765 | B1 | * 1/2002 | Daly | .................... H04N 5/2224 348/E5.022 |

(Continued)

FOREIGN PATENT DOCUMENTS

| | | |
|---|---|---|
| CN | 104732579 A | 6/2015 |
| CN | 114067041 A | 2/2022 |

(Continued)

OTHER PUBLICATIONS

M. Jamali, S. Coulombe, A. Vakili and C. Vazquez, "LSTM-Based Viewpoint Prediction for Multi-Quality Tiled Video Coding in Virtual Reality Streaming," 2020 IEEE International Symposium on Circuits and Systems (ISCAS), Seville, Spain, 2020, pp. 1-5, doi: 10.1109/ISCAS45731.2020.9180528. (Year: 2020).*

(Continued)

*Primary Examiner* — Charles L Beard
(74) *Attorney, Agent, or Firm* — GREENBLUM & BERNSTEIN, P.L.C.

(57) ABSTRACT

A method of image rendering quality prediction and path planning for large-scale scenes is provided. In the method, multiple surface points of a proxy model within a viewpoint range of a virtual viewpoint are obtained. For each surface point, a photometric error among multiple photometric information corresponding to the surface point is determined. The multiple photometric information refers to the photometric information of the surface point at multiple visible acquisition viewpoints respectively. The visible collection viewpoint are those acquisition viewpoints where the surface point is visible among the multiple acquisition viewpoints. Based on the photometric error, a viewing angle similarity and a resolution similarity between the virtual viewpoint and the visible acquisition viewpoints with respect to the surface point are determined. A rendering (Continued)

quality information of the proxy model at the virtual view-point is determined based on the viewing angle similarities and the resolution similarities.

15 Claims, 8 Drawing Sheets

(56) References Cited

U.S. PATENT DOCUMENTS

| | | | | |
|---|---|---|---|---|
| 6,975,756 | B1* | 12/2005 | Slabaugh | G06T 15/205 |
| | | | | 715/757 |
| 7,633,511 | B2* | 12/2009 | Shum | G06T 15/205 |
| | | | | 382/302 |
| 8,248,405 | B1* | 8/2012 | O'Donnell | G06T 15/06 |
| | | | | 345/426 |
| 9,342,920 | B1* | 5/2016 | McKenzie | G06T 15/08 |
| 9,418,469 | B1* | 8/2016 | Parmar | H04N 19/597 |
| 10,074,160 | B2* | 9/2018 | Kim | G06T 17/20 |
| 10,250,871 | B2* | 4/2019 | Ciurea | H04N 17/002 |
| 10,275,898 | B1* | 4/2019 | Song | H04N 13/243 |
| 10,325,402 | B1* | 6/2019 | Wang | G06T 15/503 |
| 10,410,372 | B1* | 9/2019 | Bapat | G06T 3/18 |
| 10,474,227 | B2* | 11/2019 | Carothers | G06F 3/011 |
| 10,565,773 | B1* | 2/2020 | Tytgat | G06T 15/005 |
| 10,574,974 | B2* | 2/2020 | Arora | G06T 7/55 |
| 10,785,469 | B2* | 9/2020 | Nakazato | G06T 7/194 |
| 11,087,549 | B2* | 8/2021 | Varshney | G02B 27/017 |
| 11,184,553 | B1* | 11/2021 | Liu | H04N 23/84 |
| 11,917,266 | B1* | 2/2024 | Pundi Ananth | G06V 10/82 |
| 12,099,148 | B2* | 9/2024 | Kadambi | G01B 11/0641 |
| 12,333,744 | B2* | 6/2025 | Guizilini | G01B 15/00 |
| 12,333,750 | B2* | 6/2025 | Guizilini | G06T 7/33 |
| 2003/0071194 | A1* | 4/2003 | Mueller | G06T 7/80 |
| | | | | 348/E13.016 |
| 2004/0104935 | A1* | 6/2004 | Williamson | G06V 10/10 |
| | | | | 715/757 |
| 2005/0018045 | A1* | 1/2005 | Thomas | G06V 10/147 |
| | | | | 348/E5.022 |
| 2005/0128196 | A1* | 6/2005 | Popescu | G06T 7/521 |
| | | | | 345/420 |
| 2005/0140670 | A1* | 6/2005 | Wu | G06T 15/205 |
| | | | | 345/419 |
| 2006/0232584 | A1* | 10/2006 | Utsugi | H04N 13/128 |
| | | | | 345/426 |
| 2007/0046924 | A1* | 3/2007 | Chang | G01C 7/00 |
| | | | | 356/3.01 |
| 2007/0285554 | A1* | 12/2007 | Givon | G03H 1/268 |
| | | | | 348/E13.019 |
| 2009/0315978 | A1* | 12/2009 | Wurmlin | G06T 7/85 |
| | | | | 348/E13.001 |
| 2009/0324135 | A1* | 12/2009 | Kondo | G06T 3/4053 |
| | | | | 382/284 |
| 2010/0295855 | A1* | 11/2010 | Sasakawa | G01C 11/02 |
| | | | | 345/427 |
| 2010/0329358 | A1* | 12/2010 | Zhang | H04N 19/187 |
| | | | | 375/E7.02 |
| 2011/0043613 | A1* | 2/2011 | Rohaly | G06V 20/653 |
| | | | | 348/E13.074 |
| 2011/0115886 | A1* | 5/2011 | Nguyen | H04N 13/239 |
| | | | | 348/47 |
| 2012/0075415 | A1* | 3/2012 | Kim | G06T 3/4038 |
| | | | | 348/E7.001 |
| 2012/0134560 | A1* | 5/2012 | McKenzie | G06T 15/06 |
| | | | | 382/131 |
| 2012/0141016 | A1* | 6/2012 | Wildeboer | H04N 13/111 |
| | | | | 382/154 |
| 2012/0249742 | A1* | 10/2012 | Abert | G06T 15/06 |
| | | | | 348/46 |
| 2012/0313937 | A1* | 12/2012 | Beeler | G06T 19/00 |
| | | | | 345/419 |
| 2013/0002671 | A1* | 1/2013 | Armsden | G06T 15/50 |
| | | | | 345/426 |

| | | | | |
|---|---|---|---|---|
| 2013/0107015 | A1* | 5/2013 | Morioka | H04N 13/133 |
| | | | | 348/48 |
| 2013/0120451 | A1* | 5/2013 | Sasaki | G06T 5/50 |
| | | | | 345/633 |
| 2013/0242051 | A1* | 9/2013 | Balogh | H04N 19/436 |
| | | | | 348/43 |
| 2014/0092281 | A1* | 4/2014 | Nisenzon | H04N 13/271 |
| | | | | 348/262 |
| 2014/0247326 | A1* | 9/2014 | Hebert | G01B 11/2504 |
| | | | | 348/46 |
| 2015/0016517 | A1* | 1/2015 | Mori | H04N 19/503 |
| | | | | 375/240.12 |
| 2015/0123973 | A1* | 5/2015 | Larsen | G06T 15/04 |
| | | | | 345/427 |
| 2015/0245062 | A1* | 8/2015 | Shimizu | H04N 13/111 |
| | | | | 375/240.15 |
| 2015/0249839 | A1* | 9/2015 | Shimizu | H04N 19/597 |
| | | | | 375/240.16 |
| 2015/0304531 | A1* | 10/2015 | Rodriguez Garcia | |
| | | | | H04N 5/2224 |
| | | | | 345/419 |
| 2015/0310135 | A1* | 10/2015 | Forsyth | G06F 30/13 |
| | | | | 703/1 |
| 2015/0319423 | A1* | 11/2015 | Kim | H04N 13/339 |
| | | | | 348/43 |
| 2015/0325038 | A1* | 11/2015 | Baker | G06T 15/50 |
| | | | | 345/426 |
| 2016/0005221 | A1* | 1/2016 | Mörwald | G06T 5/77 |
| | | | | 348/222.1 |
| 2016/0042556 | A1* | 2/2016 | Imber | G06T 7/90 |
| | | | | 345/426 |
| 2016/0328828 | A1* | 11/2016 | Zhang | G06T 11/60 |
| 2016/0350963 | A1* | 12/2016 | Petkov | G06T 15/06 |
| 2017/0061686 | A1* | 3/2017 | Yu | G06T 3/4038 |
| 2017/0094253 | A1* | 3/2017 | Matthews | G06V 40/166 |
| 2017/0103535 | A1* | 4/2017 | Mathsyendranath | H04N 5/262 |
| 2017/0180680 | A1* | 6/2017 | Yu | H04N 23/661 |
| 2017/0208292 | A1* | 7/2017 | Smits | G03H 1/0005 |
| 2017/0237971 | A1* | 8/2017 | Pitts | H04N 13/232 |
| | | | | 345/419 |
| 2017/0374341 | A1* | 12/2017 | Michail | G06T 19/00 |
| 2018/0047208 | A1* | 2/2018 | Marin | G06T 15/506 |
| 2018/0089849 | A1* | 3/2018 | Koizumi | G06T 7/55 |
| 2018/0203112 | A1* | 7/2018 | Mannion | H04R 1/406 |
| 2018/0204381 | A1* | 7/2018 | Kanatsu | G06T 7/248 |
| 2018/0205926 | A1* | 7/2018 | Mogalapalli | H04N 13/128 |
| 2018/0205963 | A1* | 7/2018 | Matei | H04N 21/85406 |
| 2018/0220125 | A1* | 8/2018 | Tamir | G06T 17/00 |
| 2018/0260997 | A1* | 9/2018 | Petkov | G06T 15/08 |
| 2018/0308278 | A1* | 10/2018 | Qiu | G06T 15/005 |
| 2018/0338137 | A1* | 11/2018 | Wang | H04N 13/322 |
| 2019/0075332 | A1* | 3/2019 | Onuma | H04N 13/282 |
| 2019/0082160 | A1* | 3/2019 | Yano | G06T 15/205 |
| 2019/0088004 | A1* | 3/2019 | Lucas | G06T 19/20 |
| 2019/0121224 | A1* | 4/2019 | Edwards | G09G 3/002 |
| 2019/0158813 | A1* | 5/2019 | Rowell | H04N 13/111 |
| 2019/0174109 | A1* | 6/2019 | Yoshikawa | H04N 13/243 |
| 2019/0208177 | A1* | 7/2019 | Koyama | G06T 7/593 |
| 2019/0287291 | A1* | 9/2019 | Liu | G06T 15/506 |
| 2019/0289203 | A1* | 9/2019 | Suitoh | G06F 9/30 |
| 2019/0289206 | A1* | 9/2019 | Kawaguchi | H04N 23/45 |
| 2019/0295216 | A1* | 9/2019 | Suitoh | G06T 7/30 |
| 2019/0295282 | A1* | 9/2019 | Smolyanskiy | G06N 3/063 |
| 2019/0311524 | A1* | 10/2019 | Wang | G06T 19/006 |
| 2019/0318528 | A1* | 10/2019 | Hunt | G06T 15/08 |
| 2019/0335162 | A1* | 10/2019 | Kawahara | H04N 13/282 |
| 2019/0364265 | A1* | 11/2019 | Matsunobu | H04N 13/194 |
| 2020/0005521 | A1* | 1/2020 | Youngquist | G06T 17/00 |
| 2020/0029023 | A1* | 1/2020 | Wippermann | H04N 23/685 |
| 2020/0051314 | A1* | 2/2020 | Laine | G06T 15/005 |
| 2020/0051317 | A1* | 2/2020 | Muthler | G06N 5/02 |
| 2020/0051318 | A1* | 2/2020 | Muthler | G06N 3/084 |
| 2020/0103918 | A1* | 4/2020 | Lee | G05D 1/0088 |
| 2020/0126290 | A1* | 4/2020 | Itakura | G06T 15/20 |
| 2020/0134849 | A1* | 4/2020 | Blasco Claret | G06T 7/579 |
| 2020/0184710 | A1* | 6/2020 | Besley | G06T 19/00 |
| 2020/0219301 | A1* | 7/2020 | Yu | G06T 15/10 |
| 2020/0226775 | A1* | 7/2020 | Tytgat | G06T 15/506 |

(56) References Cited

U.S. PATENT DOCUMENTS

| | | | |
|---|---|---|---|
| 2020/0228774 | A1* | 7/2020 | Kar ........................ G06T 15/08 |
| 2020/0288099 | A1* | 9/2020 | Sheng ................. H04N 13/167 |
| 2020/0302688 | A1* | 9/2020 | Hosfield ............... A63F 13/211 |
| 2020/0327718 | A1* | 10/2020 | Saragih ................... G06T 9/002 |
| 2020/0372691 | A1* | 11/2020 | Ito ......................... G06T 11/10 |
| 2020/0388002 | A1* | 12/2020 | Jung ................... H04N 13/194 |
| 2021/0004660 | A1* | 1/2021 | Ambrus ............... G06N 3/0495 |
| 2021/0004933 | A1* | 1/2021 | Wong .................. G06T 3/4038 |
| 2021/0027496 | A1* | 1/2021 | Koyama .................. G06T 7/73 |
| 2021/0044791 | A1* | 2/2021 | Zhang ...................... G06T 7/97 |
| 2021/0049371 | A1* | 2/2021 | Gu ......................... G06N 3/084 |
| 2021/0134007 | A1* | 5/2021 | Ahmed ................. G06V 20/00 |
| 2021/0209828 | A1* | 7/2021 | Li .......................... G06T 15/06 |
| 2021/0248816 | A1* | 8/2021 | Yang ........................ G06T 7/40 |
| 2021/0326601 | A1* | 10/2021 | Tang ......................... G06T 7/74 |
| 2021/0350608 | A1* | 11/2021 | Akenine-Moller ... G06T 15/005 |
| 2021/0358163 | A1* | 11/2021 | Keinert ..................... G06T 7/50 |
| 2021/0390755 | A1* | 12/2021 | Muthler ................ G06T 15/005 |
| 2021/0390757 | A1* | 12/2021 | Muthler ................. G06T 15/06 |
| 2021/0390758 | A1* | 12/2021 | Muthler ............... G06F 9/5027 |
| 2021/0390759 | A1* | 12/2021 | Muthler ................. G06T 15/08 |
| 2021/0398301 | A1* | 12/2021 | Guizilini ................... G06T 7/70 |
| 2021/0398340 | A1* | 12/2021 | Muthler ................. G06T 15/06 |
| 2021/0407174 | A1* | 12/2021 | Walker ................... G06T 15/06 |
| 2022/0036641 | A1* | 2/2022 | Vorba ..................... G06T 15/06 |
| 2022/0084231 | A1* | 3/2022 | Guizilini ................... G06T 3/18 |
| 2022/0130099 | A1* | 4/2022 | Yang ...................... G06T 15/06 |
| 2022/0130145 | A1* | 4/2022 | Connary ............... G05D 1/101 |
| 2022/0148219 | A1* | 5/2022 | Kim .......................... G06T 7/74 |
| 2022/0148254 | A1* | 5/2022 | Sorkine Hornung ........................ H04N 13/117 |
| 2022/0156525 | A1* | 5/2022 | Guizilini ............. G06N 3/0464 |
| 2022/0174259 | A1* | 6/2022 | Van Geest .......... H04N 13/194 |
| 2022/0180591 | A1* | 6/2022 | Taskov ...................... G06T 1/60 |
| 2022/0189104 | A1* | 6/2022 | Wetzstein ................ G06N 3/09 |
| 2022/0309730 | A1* | 9/2022 | Cappello .............. G06N 3/0499 |
| 2022/0309735 | A1* | 9/2022 | Bigos ................... G06T 15/205 |
| 2022/0309736 | A1* | 9/2022 | Bigos ..................... G06T 15/20 |
| 2022/0309740 | A1* | 9/2022 | Cappello .............. G06T 15/506 |
| 2022/0309742 | A1* | 9/2022 | Bigos ........................ G06N 3/09 |
| 2022/0309745 | A1* | 9/2022 | Bigos ................... G06T 15/205 |
| 2022/0319102 | A1* | 10/2022 | Tamura ............ H04N 21/21805 |
| 2022/0392089 | A1* | 12/2022 | Guizilini ................... G06N 3/09 |
| 2023/0005216 | A1* | 1/2023 | Teranishi ............... G06V 10/98 |
| 2023/0090732 | A1* | 3/2023 | Lu .............................. G06T 7/12 345/426 |
| 2023/0186500 | A1* | 6/2023 | Strandborg ........... G06T 15/205 382/154 |
| 2023/0306682 | A1* | 9/2023 | Paris ........................ G06T 7/73 |
| 2023/0326128 | A1* | 10/2023 | Vandame ............. H04N 13/111 345/419 |
| 2023/0400327 | A1* | 12/2023 | Streem ..................... G06T 7/74 |
| 2023/0410419 | A1* | 12/2023 | Baney ..................... G06T 17/00 |
| 2024/0005597 | A1* | 1/2024 | Sucar ...................... G06T 17/00 |
| 2024/0005598 | A1* | 1/2024 | Sucar ........................ G06T 7/70 |
| 2024/0046673 | A1* | 2/2024 | Lee ...................... G06V 10/764 |
| 2024/0087211 | A1* | 3/2024 | Muthler ................. G06T 15/06 |
| 2024/0095993 | A1* | 3/2024 | Muthler ............... G06T 15/005 |
| 2024/0095994 | A1* | 3/2024 | Muthler ................. G06T 15/06 |
| 2024/0095995 | A1* | 3/2024 | Muthler ................. G06T 15/30 |
| 2024/0104771 | A1* | 3/2024 | Zelek ..................... G06T 7/579 |
| 2024/0104828 | A1* | 3/2024 | Wang ..................... G06T 15/20 |
| 2024/0107110 | A1* | 3/2024 | Kroon ........... H04N 21/234363 |
| 2024/0135632 | A1* | 4/2024 | Ahn ........................ G06T 15/06 |
| 2024/0153197 | A1* | 5/2024 | Guizilini ................ G06T 15/08 |
| 2024/0153200 | A1* | 5/2024 | Suprun ..................... G06T 7/70 |
| 2024/0169712 | A1* | 5/2024 | Chen ................... G06V 10/806 |
| 2024/0223742 | A1* | 7/2024 | Xiong ................. G06T 19/006 |
| 2024/0249462 | A1* | 7/2024 | Chupeau ................ G06T 15/06 |
| 2024/0257475 | A1* | 8/2024 | Xiong ..................... G06T 7/593 |
| 2024/0290007 | A1* | 8/2024 | Sagong ..................... G06T 7/90 |
| 2024/0340398 | A1* | 10/2024 | Varekamp ........... H04N 13/282 |
| 2024/0354979 | A1* | 10/2024 | Jadhav ...................... G06T 7/70 |
| 2024/0355047 | A1* | 10/2024 | Supikov ................. G06T 17/00 |
| 2024/0371073 | A1* | 11/2024 | van Antwerpen ...... G06T 15/06 |
| 2024/0386650 | A1* | 11/2024 | Ghazvinian Zanjani .................... G06T 7/50 |
| 2024/0420341 | A1* | 12/2024 | Li .............................. G06T 7/90 |
| 2025/0030831 | A1* | 1/2025 | Sun ...................... H04N 13/398 |
| 2025/0078299 | A1* | 3/2025 | Liu .......................... G06T 3/40 |
| 2025/0078312 | A1* | 3/2025 | Devitt ...................... G06T 7/55 |
| 2025/0095380 | A1* | 3/2025 | Kanai ..................... G06V 20/56 |
| 2025/0104323 | A1* | 3/2025 | Nonn ..................... G06T 15/08 |
| 2025/0157133 | A1* | 5/2025 | Snavely ................. G06T 15/20 |
| 2025/0166125 | A1* | 5/2025 | Tang ......................... G06T 7/73 |
| 2025/0218111 | A1* | 7/2025 | Huang ................. G06T 15/506 |
| 2025/0225720 | A1* | 7/2025 | Karasawa .............. G06T 15/06 |

FOREIGN PATENT DOCUMENTS

| | | |
|---|---|---|
| CN | 114627227 A | 6/2022 |
| WO | 2022124026 A1 | 6/2022 |

OTHER PUBLICATIONS

Ren et al., "A Multi-thread Asynchronous Dispatch Algorithm for Large-scale Virtual Terrain Data," Computer and Modernization (2018); 5 pages.
Ding et al., "Pose Estimation of Multiple Viewpoints for Three-Dimensional Digital Imaging System," Acta Optica Sinica, Mar. 2007); 27(3):1-6.
Wang et al., "NeRF—: Neural Radiance Fields Without Known Camera Parameters," (Feb. 2021); 1-10.

* cited by examiner

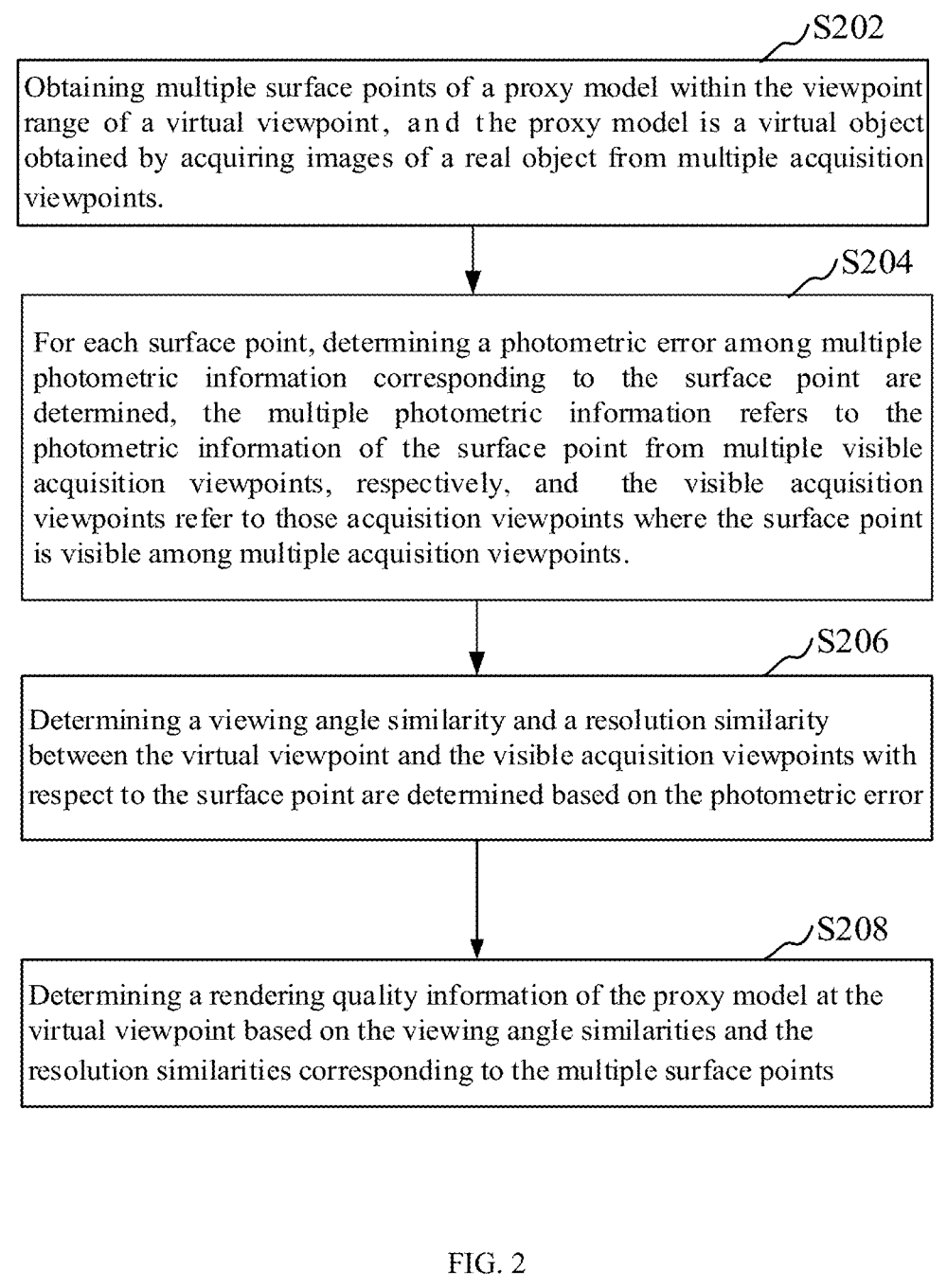

S202

Obtaining multiple surface points of a proxy model within the viewpoint range of a virtual viewpoint, and the proxy model is a virtual object obtained by acquiring images of a real object from multiple acquisition viewpoints.

S204

For each surface point, determining a photometric error among multiple photometric information corresponding to the surface point are determined, the multiple photometric information refers to the photometric information of the surface point from multiple visible acquisition viewpoints, respectively, and the visible acquisition viewpoints refer to those acquisition viewpoints where the surface point is visible among multiple acquisition viewpoints.

S206

Determining a viewing angle similarity and a resolution similarity between the virtual viewpoint and the visible acquisition viewpoints with respect to the surface point are determined based on the photometric error

S208

Determining a rendering quality information of the proxy model at the virtual viewpoint based on the viewing angle similarities and the resolution similarities corresponding to the multiple surface points

FIG. 2

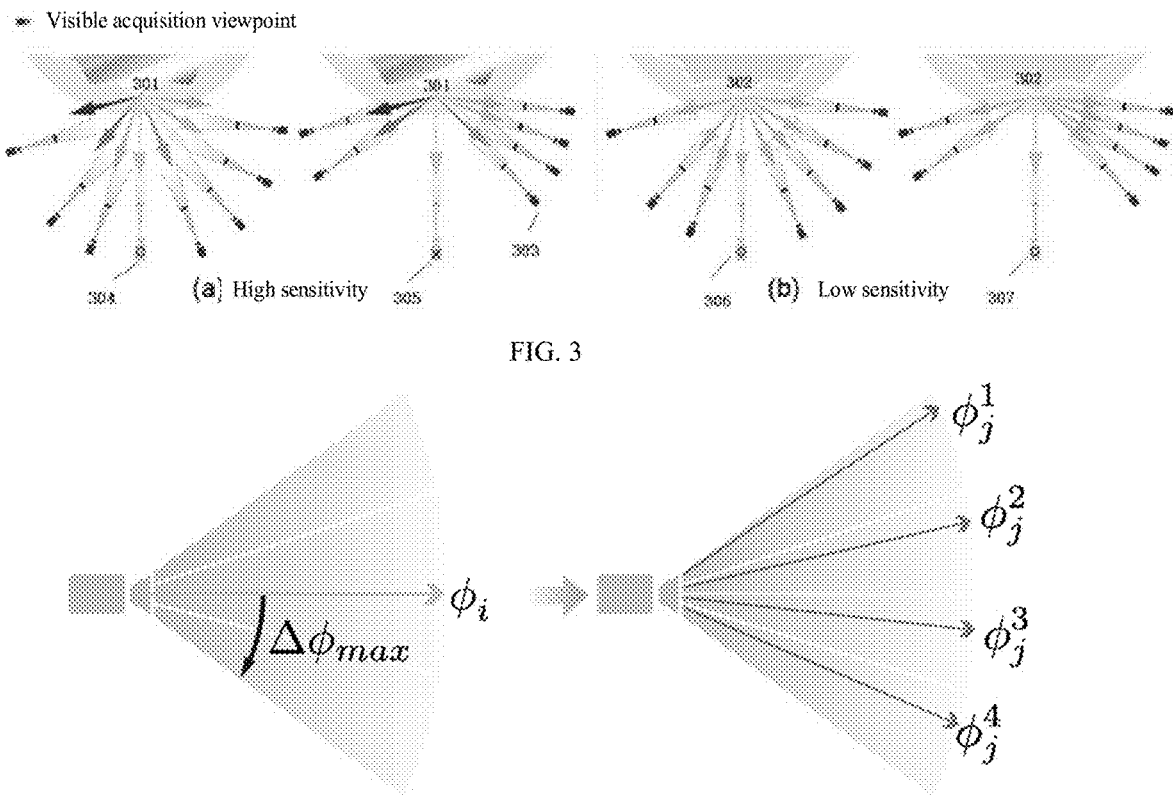
FIG. 3
FIG. 4
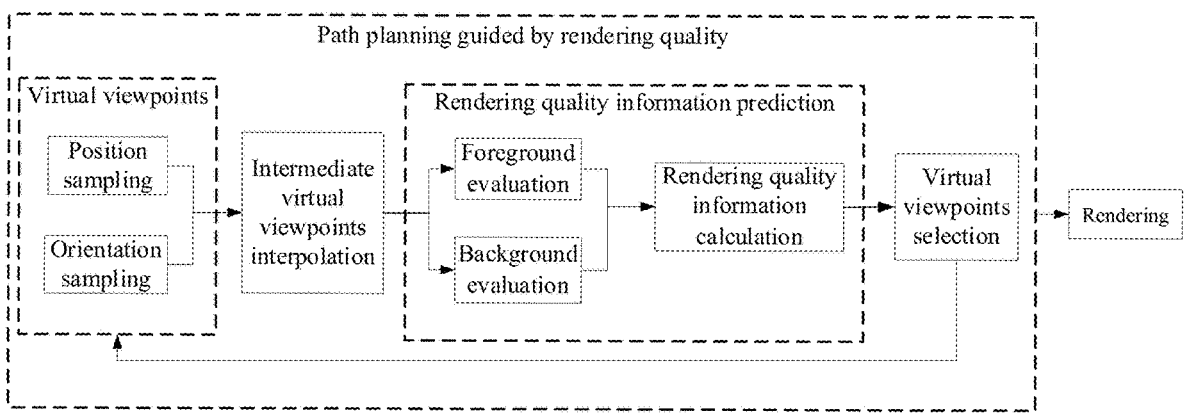
FIG. 5

SYSTEM AND METHOD OF IMAGE RENDERING QUALITY PREDICTION AND PATH PLANNING FOR LARGE-SCALE SCENES, AND COMPUTER DEVICE

CROSS-REFERENCE TO RELATED APPLICATIONS

The present application claims priority to Chinese patent application No. 202210875075.9, entitled "SYSTEM OF IMAGE RENDERING QUALITY PREDICTION AND PATH PLANNING FOR LARGE-SCALE SCENES", filed on Jul. 25, 2022, the entire content of which is incorporated herein by reference.

TECHNICAL FIELD

The present application relates to the image processing technology, and in particular, to a system and method of image rendering quality prediction and path planning for large-scale scenes, and a computer device.

BACKGROUND

With the technological development and market popularization of VR headsets (virtual reality head-mounted display devices) and drones, more and more applications require the rendering of real scenes. Image-based rendering technology has become the best technical solution to meet such requirements due to its low cost and high efficiency. Due to its low input data acquisition threshold and broad application prospects, image-based rendering has become the focus of most research and has therefore been widely studied.

In the process of image rendering, a virtual viewpoint usually needs to be selected for rendering. Generally, the virtual viewpoint is selected based on a user's subjective evaluation of the rendering result at a certain virtual viewpoint, making it difficult to quantify the evaluation of the virtual viewpoint. Therefore, it is necessary to predict the rendering quality at the virtual viewpoint to evaluate the quality of the selected virtual viewpoint.

SUMMARY

In view of this, for the above technical problems, it is necessary to provide a system of image rendering quality prediction and path planning for large-scale scenes that can evaluate a virtual viewpoint.

In a first aspect, the present disclosure provides a method of image rendering quality prediction and path planning for large-scale scenes. The method includes: obtaining multiple surface points of a proxy model within a viewpoint range of a virtual viewpoint. The proxy model is a virtual object obtained by acquiring images of a real object from multiple acquisition viewpoints. For each surface point, a photometric error among multiple photometric information corresponding to the surface point is determined. The multiple photometric information refers to the photometric information of the surface point at multiple visible acquisition viewpoints respectively. The visible collection viewpoint are those acquisition viewpoints where the surface point is visible among the multiple acquisition viewpoints. Based on the photometric error, a viewing angle similarity and a resolution similarity between the virtual viewpoint and the visible acquisition viewpoints with respect to the surface point are determined. A rendering quality information of the proxy model at the virtual viewpoint is determined based on the viewing angle similarities and the resolution similarities corresponding to the multiple surface points.

In one of the embodiments, the photometric error is a first photometric error, and the multiple photometric information are multiple first photometric information. The method further includes determining multiple first rays that are emitted from the virtual viewpoint and do not intersect with the proxy model. Second rays respectively emitted from the multiple acquisition viewpoints are determined. The second rays are parallel to the first rays and do not intersect with the proxy model. Second photometric errors among multiple second photometric information of the multiple second rays are determined. The second photometric information are the photometric information of those points that are located on the second rays and intersect with a background of the proxy model. A background rendering quality corresponding to the virtual viewpoint is obtained based on the multiple second photometric errors corresponding to the multiple first rays. The determining the rendering quality information of the proxy model at the virtual viewpoint based on the viewing angle similarity and the resolution similarity corresponding to the multiple surface points includes: determining the rendering quality information corresponding to the virtual viewpoint based on the background rendering quality, the viewing angle similarity and the resolution similarity corresponding to the multiple surface points.

In one of the embodiments, the determining the viewing angle similarity and the resolution similarity between the virtual viewpoint and the visible acquisition viewpoints with respect to the surface point based on the photometric error includes: determining angle information between the virtual viewpoint and each visible acquisition viewpoint with respect to the surface point; determining distance information of the virtual viewpoint and each visible acquisition viewpoint with respect to the surface point; determining the viewing angle similarity between the virtual viewpoint and the visible acquisition viewpoints with respect to the surface point based on the photometric error and the angle information; and determining the resolution similarity between the virtual viewpoint and the visible acquisition viewpoints with respect to the surface point based on the photometric error and the distance information.

In one of the embodiments, the determining the angle information between the virtual viewpoint and each visible acquisition viewpoint with respect to the surface point includes: determining a virtual ray between the virtual viewpoint and the surface point; determining an acquisition ray between the visible acquisition viewpoint and the surface point; and determining a value of an angle between the virtual ray and the acquisition as the angle information between the virtual viewpoint and the visible acquisition viewpoint with respect to the surface point.

In one of the embodiments, the determining the distance information of the virtual viewpoint and each visible acquisition viewpoint with respect to the surface point includes: determining a virtual distance between the virtual viewpoint and the surface point; determining an acquisition distance between the visible acquisition viewpoint and the surface point; and obtaining the distance information of the virtual viewpoint and the visible acquisition viewpoint with respect to the surface point based on a ratio of a distance difference between the virtual distance and the acquisition di stance to the acquisition distance.

In one of the embodiments, the determining the viewing angle similarity between the virtual viewpoint and the visible acquisition viewpoints with respect to the surface point based on the photometric error and the angle information includes: determining a minimum angle information from the angle information corresponding to the multiple visible acquisition viewpoints; and determining the viewing angle similarity between the virtual viewpoint and the visible acquisition viewpoints with respect to the surface point based on the photometric error and the minimum angle information. In the case that the minimum angle information remains unchanged, the photometric error is negatively correlated with the viewing angle similarity.

In one of the embodiments, the determining the resolution similarity between the virtual viewpoint and the visible acquisition viewpoints with respect to the surface point based on the photometric error and the distance information includes: determining a minimum distance information from the distance information corresponding to the multiple visible acquisition viewpoints, and determining the resolution similarity between the virtual viewpoint and the visible acquisition viewpoints with respect to the surface point based on the minimum distance information and the photometric error. In the case that the minimum distance information remains unchanged, the photometric error is negatively correlated with the resolution similarity.

In one of the embodiments, before obtaining the multiple surface points of the proxy model within the viewpoint range of the virtual viewpoint, the method further includes: determining a start point and an end point of an acquisition path of a virtual camera and a rendering quality threshold, and selecting the virtual viewpoint based on multiple path points between the start point and the end point. After determining the rendering quality corresponding to the virtual viewpoint based on the viewing angle similarities and the resolution similarities corresponding to the multiple surface points, the method further includes reselecting, if the rendering quality is less than the rendering quality threshold, a new virtual viewpoint and repeat the step of obtaining the multiple surface points on the proxy model within the viewpoint range of the virtual viewpoint and subsequent steps until a distance between a selected virtual viewpoint and the end point satisfies an ending condition.

In a second aspect, the present disclosure further provides a system of image rendering quality prediction and path planning for large-scale scenes. The system includes a prediction end. The prediction end is configured to: obtain multiple surface points of a proxy model within a viewpoint range of a virtual viewpoint. The proxy model is a virtual object obtained by acquiring images of a real object from multiple acquisition viewpoints. For each of the surface points, a photometric error among multiple photometric information corresponding to the surface point is determined. The multiple photometric information are the photometric information of the surface point at multiple visible acquisition viewpoints respectively, and the visible acquisition viewpoints are those acquisition viewpoints where the surface is visible among the multiple acquisition viewpoints. The prediction end is further configured to determine a viewing angle similarity and a resolution similarity between the virtual viewpoint and the visible acquisition viewpoints with respect to the surface point based on the photometric error. The prediction end is further configured to determine a rendering quality information of the proxy model at the virtual viewpoint based on the viewing angle similarities and the resolution similarities corresponding to the multiple surface points.

In a third aspect, the present disclosure further provides a computer device. The computer device includes a memory and a processor. The memory stores a computer program. When executing the computer program, the processor implements steps of the above method of image rendering quality prediction and path planning for large-scale scenes.

In a fourth aspect, the present disclosure further provides a non-transitory computer readable storage medium, on which a computer program is stored. The computer program is executed by the processor to implement steps of the above method of image rendering quality prediction and path planning for large-scale scenes.

In a fifth aspect, the present disclosure further provides a computer program product, which includes a computer program. The computer program is executed by a processor to implement steps of the above method of image rendering quality prediction and path planning for large-scale scenes.

BRIEF DESCRIPTION OF THE DRAWINGS

FIG. 2 is a schematic flowchart of a method of image rendering quality prediction and path planning for large-scale scenes according to an embodiment.

FIG. 3 is a principle schematic diagram of a method of image rendering quality prediction and path planning for large-scale scenes according to an embodiment.

FIG. 4 is a principle schematic diagram of a method of image rendering quality prediction and path planning for large-scale scenes according to an embodiment.

FIG. 5 is an application schematic diagram of a method of image rendering quality prediction and path planning for large-scale scenes according to an embodiment.

DETAILED DESCRIPTION OF THE EMBODIMENTS

In order to make the purpose, technical solutions and advantages of the present disclosure more clear, the present application will be further described in detail below with reference to the accompanying drawings and embodiments. It should be understood that the specific embodiments described herein are only used to explain the present disclosure, but not to limit the present disclosure.

Figure 1:
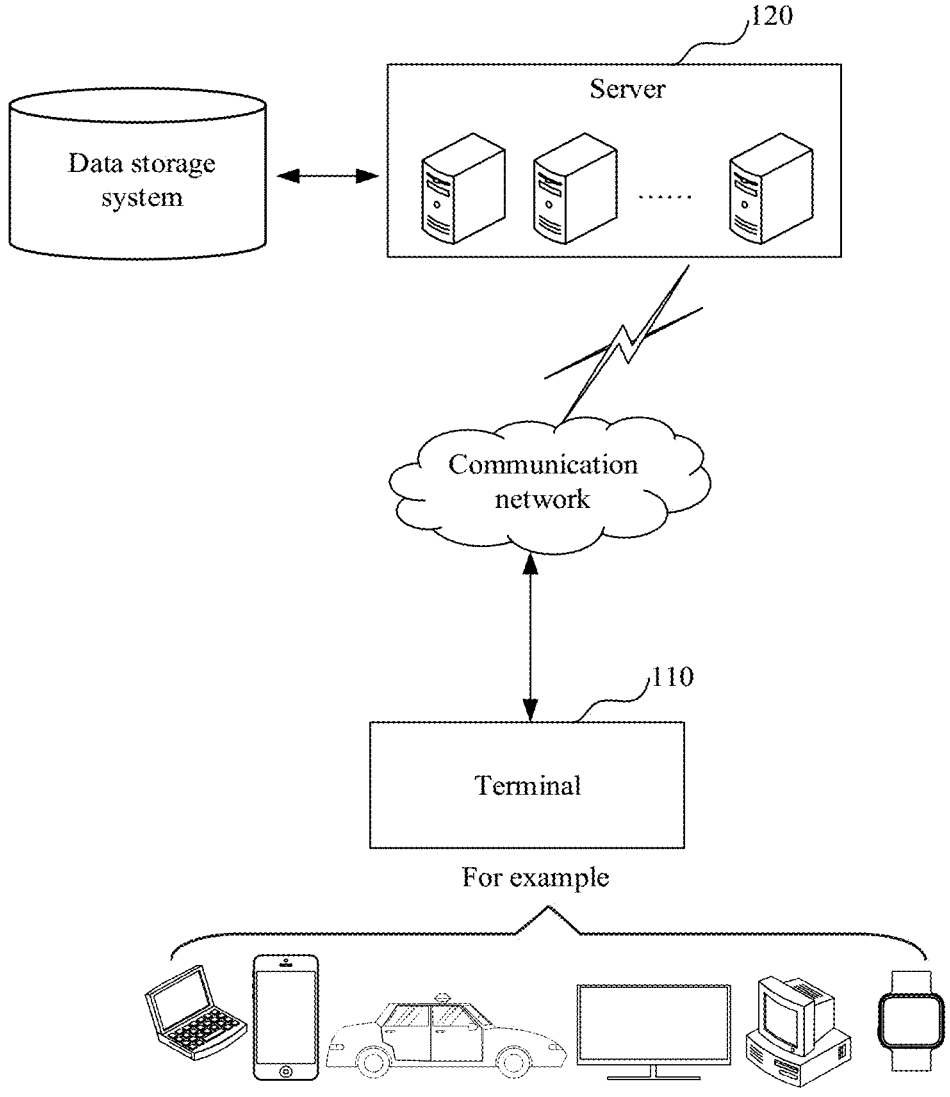
FIG. 1 is an application environment diagram of a method of image rendering quality prediction and path planning for large-scale scenes according to an embodiment.

A method of image rendering quality prediction and path planning for large-scale scenes provided by the embodiments of the present application may be applied to an application environment shown in FIG. 1. In the application environment, a terminal 110 communicates with a server 120 through a network. A data storage system can store data to be processed by the server 120. The data storage system can be integrated in the server 120, or placed in a cloud server or other network servers. The terminal 110 may be, but is not limited to, various personal computers, laptops, smart phones, tablet computers, and portable wearable devices. The server 120 may be implemented with an independent server or a server cluster composed of multiple servers.

The server 120 can acquire multiple surface points of a proxy model within the viewpoint range of a virtual viewpoint. The proxy model is a virtual object obtained by acquiring images of a real object from multiple acquisition viewpoints. For each surface point, the server 120 determines a photometric error among multiple photometric information corresponding to the surface point. The multiple photometric information refers to the photometric information of the surface point at multiple visible acquisition viewpoints, respectively. The visible acquisition viewpoints refer to those acquisition viewpoints where the surface point is visible among multiple acquisition viewpoints. The server 120 determines a viewing angle similarity and resolution similarity between the virtual viewpoint and the visible acquisition viewpoints with respect to the surface point based on the photometric error. The server 120 determines the rendering quality information of the proxy model at the virtual viewpoint based on the viewing angle similarities and the resolution similarities corresponding to the multiple surface points. The server 120 may send the rendering quality information of the virtual viewpoint to the terminal 110, so that the terminal 110 evaluates the virtual viewpoint based on the rendering quality information.

In some embodiments, the terminal 110 may also be replaced by a server. The implementation of the terminal and server is not limited in the present disclosure.

In other embodiments, the server 120 may also be replaced by a terminal. The server 120 is not limited in the present application.

In some embodiments, as shown in FIG. 2, a method of image rendering quality prediction and path planning for large-scale scenes is provided. The embodiments will be illustrated by taking the method applied to a server as an example. It should be understood that the method may also be applied to a terminal. The method may also be applied to a system including a terminal and a server, and implemented by interactions of the terminal and the server. In the embodiments, the method includes the following steps.

At step S202, multiple surface points of a proxy model within the viewpoint range of a virtual viewpoint are obtained. The proxy model is a virtual object obtained by acquiring images of a real object from multiple acquisition viewpoints.

A viewpoint includes position and orientation, i.e., positions and orientations can be used to distinguish different viewpoints.

Specifically, the server acquires images of a real object from multiple acquisition viewpoints and generates a proxy model according to the image acquisition results. The server determines a virtual viewpoint and determines multiple surface points of the proxy model within the viewpoint range of the virtual viewpoint.

In some embodiments, the server emits multiple rays from the virtual viewpoint. At least one of the multiple rays intersects with the proxy model, and the server may take the intersection point as a surface point.

At step S204, for each surface point, a photometric error among multiple photometric information corresponding to the surface point are determined. The multiple photometric information refers to the photometric information of the surface point from multiple visible acquisition viewpoints, respectively. The visible acquisition viewpoints refer to those acquisition viewpoints where the surface point is visible among multiple acquisition viewpoints.

The photometric information represents the intensity of the light reflected by the surface point and may include color information. It can be understood that the difference of the photometric information received from different visible acquisition viewpoints is relatively small when the surface point is located on a diffuse reflective surface, and the difference of the photometric information received from different visible acquisition viewpoints is relatively large when the surface point is located on a specular reflective surface. The visible acquisition viewpoints refer to those acquisition viewpoints where the surface point is visible among multiple acquisition viewpoints.

Specifically, for each surface point, the server determines a photometric error among multiple photometric information corresponding to the surface point. The multiple photometric information refers to the photometric information of the surface point at multiple visible acquisition viewpoints, respectively.

In some embodiments, the server determines a first error between each two photometric information and average the multiple determined first errors to obtain the photometric error. Specifically, assuming that a surface point is p, $v_i$ represents a virtual viewpoint, $v_j$ represents a visible acquisition viewpoint, $V^p$ represents a set of multiple visible acquisition viewpoints, $c(v_i, p)$ represents the photometric information of viewing the surface point p at the virtual viewpoint, $c(v_j, p)$ represents the photometric information of viewing the surface point p at the visible acquisition viewpoint, and $c_{photo}(V^p)$ represents the photometric error among the photometric information received when viewing the same surface point p at different visible acquisition viewpoints. The photometric error $c_{photo}(V')$ can be calculated according to the following equation:

$$c_{photo}(V^p) = \begin{cases} \dfrac{\sum_{v_i, v_j \in V^p, i \neq j} \|c(v_j, p) - c(v_j, p)\|_2}{N_{pair}} & N_{pair} > 0 \\ 0, & N_{pair} = 0 \end{cases}$$

where $N_{pair} = (|V^p * (V^p - 1)|)/2$ is the number of pairs of the visible acquisition viewpoints where the surface point p can be seen. When $N_{pair}$ is equal to 0, i.e., the number of the visible acquisition viewpoints where the surface point p can be seen is less than 2, $c_{photo}(V^p)$ will be 0.

In some embodiments, the server obtains a reconstructibility of the surface point p based on the photometric error. The greater the photometric error, the smaller the reconstructibility. The smaller the photometric error, the greater the reconstructibility. The specific equation for calculating the reconstructibility $h_{geo}(V^p)$ is as follows:

$$h_{geo}(V^p) = 1 - c_{photo}(V^p)$$

At step S206, a viewing angle similarity and a resolution similarity between the virtual viewpoint and the visible acquisition viewpoints with respect to the surface point are determined based on the photometric error.

A viewing angle similarity refers to the similarity between a first viewing angle viewing the surface point from the virtual viewpoint and a second viewing angle viewing the surface point from a visible acquisition viewpoint. The resolution similarity refers to the similarity between a first resolution viewing the surface point from the virtual viewpoint and a second resolution viewing the surface point from the visible acquisition viewpoint.

Specifically, the server determines the viewing angle similarity and resolution similarity between the virtual viewpoint and the visible acquisition viewpoints with respect to the surface point based on the photometric error.

In some embodiments, the viewing angle similarity is calculated based on angle information between the virtual viewpoint and the visible acquisition viewpoints with respect to the surface point and the photometric error. The resolution similarity is calculated based on distance information of the virtual viewpoint and the visible acquisition viewpoints with respect to the surface point and the photometric error.

In some embodiments, the server obtains the angle information according to a virtual ray between the virtual viewpoint and the surface point, and acquisition rays between the visible acquisition viewpoints and the surface point.

In some embodiments, the server obtains the distance information according to a virtual distance between the virtual viewpoint and the surface point, and acquisition distances between the visible acquisition viewpoints and the surface point.

In some embodiments, the server selects the minimum angle information from the respective angle information of the multiple visible acquisition viewpoints, and the minimum angle information is negatively correlated with the viewing angle similarity.

In some embodiments, the server selects the minimum distance information from the respective distance information of the multiple visible acquisition viewpoints, and the minimum distance information is negatively correlated with the resolution similarity.

At step S208, a rendering quality information of the proxy model at the virtual viewpoint is determined based on the viewing angle similarities and the resolution similarities corresponding to the multiple surface points.

Specifically, the server calculates the rendering quality information of the proxy model at the virtual viewpoint based on the viewing angle similarities and the resolution similarities corresponding to the multiple surface points. It can be understood that what is rendered may be a part of the proxy model since the virtual viewpoint has a certain viewing angle range.

In some embodiments, the server may also determine the rendering quality information of the proxy model at the virtual viewpoint based on a background rendering quality at the virtual viewpoint, the viewing angle similarities and the resolution similarities corresponding to the multiple surface points. The background rendering quality is configured to represent the accuracy of the pixels of the background in the rendered image.

In some embodiments, the server determines a start point and end point of an acquisition path of a virtual camera and a rendering quality threshold, selects virtual viewpoints based on path points between the start point and the end point, and preforms a selection to the multiple virtual viewpoints based on the rendering quality information to obtain the virtual viewpoints in the acquisition path of the virtual camera.

In the aforementioned method of image rendering quality prediction and path planning for large-scale scenes, the multiple surface points of the proxy model within the viewpoint range of the virtual viewpoint are obtained. The proxy model is a virtual object obtained by acquiring images of a real object from multiple acquisition viewpoints. For each surface point, the photometric error among the multiple photometric information corresponding to the surface point is determined. The multiple photometric information refers to the photometric information of the surface point at multiple visible acquisition viewpoints, respectively. The visible acquisition viewpoints refer to those acquisition viewpoints where the surface point is visible among multiple acquisition viewpoints. It can be understood that the photometric error can represent the degree of surface diffuse reflection of the real object corresponding to the proxy model. Based on the photometric error, the viewing angle similarity and resolution similarity between the virtual viewpoint and the visible acquisition viewpoints with respect to the surface point are determined. In this way, the viewing angle similarity and the resolution similarity can be determined according to the degree of diffuse reflection, thereby improving the accuracy of the viewing angle similarity and resolution similarity. The rendering quality information of the proxy model at the virtual viewpoint is determined based on the viewing angle similarities and resolution similarities corresponding to multiple surface points. In this way, the rendering quality information of the virtual viewpoint can be predicted to evaluate the virtual viewpoint, and the evaluation accuracy is improved.

In some embodiments, determining the viewing angle similarity and the resolution similarity between the virtual viewpoint and the visible acquisition viewpoints with respect to the surface point based on the photometric error includes determining the angle information between the virtual viewpoint and each visible acquisition viewpoint with respect to the surface point, determining the distance information of the virtual viewpoint and each visible acquisition viewpoint with respect to the surface point, determining the viewing angle similarity between the virtual viewpoint and the visible acquisition viewpoints with respect to the surface point based on the photometric error and the angle information, and determining the resolution similarity between the virtual viewpoint and the visible acquisition viewpoints with respect to the surface point based on the photometric error and the distance information.

Specifically, the server determines the angle information between the virtual viewpoint and the visible acquisition viewpoints with respect to the surface point, and determines the distance information of the virtual viewpoint and the visible acquisition viewpoints with respect to the surface point. Further, the server determines the viewing angle similarity between the virtual viewpoint and the visible acquisition viewpoints with respect to the surface point based on the photometric error and the angle information, and determines the resolution similarity between the virtual viewpoint and the visible acquisition viewpoints with respect to the surface point based on the photometric error and the distance information. It can be understood that a larger photometric error indicates that a surface point may be located on a specular reflective surface, and accordingly, the angle information has a greater impact on the viewing angle similarity, while the distance information has a greater impact on the resolution similarity. A smaller photometric error indicates that a surface point may be located on the diffuse reflective surface, and accordingly, the angle information has a smaller impact on the viewing angle similarity, while the distance information has a smaller impact on the resolution similarity.

In the above embodiments, using the angle information and the photometric error to determine the viewing angle similarity can improve the accuracy of the viewing angle similarity compared to using only the angle information. Using the distance information and the photometric error to determine the resolution similarity can improve the accuracy of the resolution similarity compared to using only the distance information.

In some embodiments, determining the angle information between the virtual viewpoint and each visible acquisition viewpoint with respect to the surface point includes determining a virtual ray between the virtual viewpoint and the surface point, determining an acquisition ray between the visible acquisition viewpoint and the surface point, and determining the value of the angle between the virtual ray and the acquisition ray as the angle information between the virtual viewpoint and the visible acquisition viewpoint with respect to the surface point.

Specifically, the server determines the virtual ray between the virtual viewpoint and the surface point, and determines the acquisition ray between the visible acquisition viewpoint and the surface point. The server determines the value of the angle between the virtual ray and the acquisition ray as the angle information between the virtual viewpoint and the visible acquisition viewpoint with respect to the surface point.

In some embodiments, the angle information is calculated based on the optical center coordinate of the visible acquisition viewpoint, the optical center coordinate of the virtual viewpoint, and the coordinate of the surface point. The specific equation is as follows:

$$d_r^a(v, v_t, p) = \angle opo_t$$

where v is the visible acquisition viewpoint, $v_t$ is the virtual viewpoint, o and $o_t$ are the optical center coordinates of the visible acquisition viewpoint and the virtual viewpoint, respectively. It can be understood that the server can determine the virtual ray and the acquisition ray through the coordinates, and $d_r^a$ represents the angle between the rays projected by surface point p at the visible acquisition viewpoint v and the virtual viewpoint $v_t$. $\angle opo_t$ is the angle information between the visible acquisition viewpoint v and the virtual viewpoint $v_t$ with respect to the surface point p.

In these embodiments, the angle information is determined according to the virtual ray and acquisition ray, so that the angle information is accurate and effective.

In some embodiments, determining the distance information between the virtual viewpoint and each visible acquisition viewpoint with respect to the surface point includes: determining a virtual distance between the virtual viewpoint and the surface point, determining an acquisition distance between the visible acquisition viewpoint and the surface point, and determining the distance information between the virtual viewpoint and the visible acquisition viewpoint with respect to the surface point based on a ratio of the distance difference between the virtual distance and the acquisition distance to the acquisition distance.

Specifically, the server determines the virtual distance between the virtual viewpoint and the surface point, and determines the acquisition distance between the visible acquisition viewpoint and the surface point. The server obtains the distance information of the virtual viewpoint and the visible acquisition viewpoint with respect to the surface point based on the ratio of the distance difference between the virtual distance and the acquisition distance to the acquisition distance. It can be understood that the distance information is quantified by a proportional value, so that the same quantification standard can be used when there are different acquisition distances or virtual distances.

In some embodiments, the distance information can be calculated based on the optical center coordinates of the visible acquisition viewpoint and the virtual viewpoint, and the coordinates of the surface points. The specific equation is as follows:

$$d_r^t(v, v_t, p) = \max\left(0, \frac{\|o - p\| - \|o_t - p\|}{\|o - p\|}\right)$$

where $\|o-p\|$ is the acquisition distance from the visible viewpoint to the surface point, $\|o_t-p\|$ is the virtual distance from the virtual viewpoint to the surface point, $\|o-p\|-\|o_t-p\|$ is the distance difference between the virtual distance and the acquisition distance.

$$d_r^t$$

represents the relative distance between the virtual viewpoint and the acquisition viewpoint, thereby indirectly evaluating the resolution quality of the rendering result.

In these embodiments, the distance information is determined according to the virtual distance and the acquisition distance, so that the distance information is accurate and effective.

In some embodiments, determining the viewing angle similarity between the virtual viewpoint and the visible acquisition viewpoints with respect to the surface point based on the photometric error and the angle information includes determining the minimum angle information from the angle information corresponding to the multiple visible acquisition viewpoints, and determining the viewing angle similarity between the virtual viewpoint and the visible acquisition viewpoints with respect to the surface point based on the photometric error and the minimum angle information. In the case that the minimum angle information remains unchanged, the photometric error is negatively correlated with the viewing angle similarity.

Specifically, the server determines the minimum angle information from the angle information corresponding to the multiple visible collection viewpoints, and determines the viewing angle similarity between the virtual viewpoint and the visible acquisition viewpoint with respect to the surface point based on the photometric error and the minimum angle information. In the case that the minimum angle information remains unchanged, the photometric error is negatively correlated with the viewing angle similarity.

In some embodiments, the viewing angle similarity $h_{ang}$ is calculated as follows:

$$h_{ang} = \exp\left(-\tan\left(\frac{\pi}{2} \cdot c_{photo}(V^p)\right) \cdot \min_{v_i \in V^p} d_r^a(v_i, v_t, p)\right)$$

where, $V^p$ is a set of multiple visible acquisition viewpoints, $$\min_{v_i \in V^p} d_r^a(v_i, v_t, p)$$

represents the minimum angle information determined from the angle information corresponding to the multiple visible acquisition viewpoints. The server uses the minimum angle difference (rather than the average or maximum difference) as the basic factor because the geometrically closest ray contributes the most to the final rendering result. The photometric error $c_{photo}$ processed by the tan function controls the change rate of $h_{ang}$. The rougher the surface material or the more homogeneous the texture of the object, the smaller the correlation with the viewpoint and the change in resolution. As a result, it is more likely to use those visible acquisition angles with large differences in angle and resolution to accurately recover pixel colors.

FIG. 3 shows the influence of the photometric error $c_{photo}$ on the orientation sensitivity of $h_{ang}$. Points 301 and 302 are the surface points on the proxy model. Points 303 are visible acquisition viewpoints (there are multiple visible acquisition viewpoints). Points 304, 305, 306 and 307 are virtual viewpoints. From the colors of light reflected by the surface point 301 and the surface point 302 as shown in FIG. 3, it can be known that the surface where surface point 301 is located has a more mirror effect compared to the surface point 302, i.e., the photometric error of subfigure (a) is greater than that of subfigure (b), and therefore the sensitivity of the viewpoint angle of subfigure (a) is greater than that of subfigure (b). In subfigure (a), the virtual viewpoint 304 has a different number and distribution of visible acquisition viewpoints compared to the virtual viewpoint 305. The angles between the virtual viewpoint 304 and the visible acquisition viewpoints are smaller than that between the virtual viewpoint 305 and the visible acquisition viewpoints, and due to the large photometric error, the change rate of the viewing angle similarity $h_{ang}$ is relatively large. Therefore, the viewing angle similarity corresponding to the virtual viewpoint 304 is greater than the viewing angle similarity $h_{ang}$ corresponding to the virtual viewpoint 305. In subfigure (b), the virtual viewpoint 306 has a different number and distribution of visible acquisition viewpoints compared to the virtual viewpoint 307. Although the angles between the virtual viewpoint 306 and the visible acquisition viewpoints 303 are smaller than that between the virtual viewpoint 307 and the visible acquisition viewpoints, due to the small photometric error, the change rate of the viewing angle similarity $h_{ang}$ is relatively small. Therefore, so the viewing angle similarity corresponding to the virtual viewpoint 306 is close to the viewing angle similarity corresponding to the virtual viewpoint 307.

In these embodiments, in the case that the minimum angle information remains unchanged, the photometric error and the viewing angle similarity are negatively correlated, thus improving the accuracy of the viewing angle similarity.

In some embodiments, determining the resolution similarity between the virtual viewpoint and the visible acquisition viewpoints with respect to the surface point based on the photometric error and the distance information includes determining the minimum distance information from the distance information corresponding to the multiple visible acquisition viewpoints, and determining the resolution similarity between the virtual viewpoint and the visible acquisition viewpoints with respect to the surface point based on the minimum distance information and the photometric error. In the case that the minimum distance information remains unchanged, the photometric error is negatively correlated with the resolution similarity.

Specifically, the server determines the minimum distance information from the distance information corresponding to the multiple visible acquisition viewpoints, and determines the resolution similarity between the virtual viewpoint and the visible acquisition viewpoints with respect to the surface point based on the minimum distance information and the photometric error. In the case that the minimum distance information remains unchanged, the photometric error is negatively correlated with the resolution similarity.

In some embodiments, the resolution similarity $h_{res}$ is calculated according to the following equation:

$$h_{res} = \exp\left(-\tan\left(\frac{\pi}{2} \cdot c_{photo}(V^p)\right) \cdot \min_{v_i \in V^p} d_r^t(v_i, v_t, p)\right)$$

where $$\min_{v_i \in V^p} d_r^t(v_i, v_t, p)$$

represents the minimum distance information determined from the distance information corresponding to the multiple visible acquisition viewpoints. The server uses the minimum distance difference (rather than the average or maximum difference) as the basic factor because the geometrically closest ray contributes the most to the final rendering result. The photometric error $C_{photo}$ processed by the tan function controls the change rate of $h_{res}$.

In these embodiments, in the case that the minimum distance information remains unchanged, the photometric error is negatively correlated with the resolution similarity, thus improving the accuracy of the resolution similarity.

In some embodiments, the multiple photometric information are multiple first photometric information, and the photometric error is a first photometric error. The method further includes determining multiple first rays that are emitted from the virtual viewpoint and do not intersect with the proxy model. For the first rays, second rays respectively emitted from the multiple acquisition viewpoints are determined. The second rays are parallel to the first rays and do not intersect with the proxy model. Second photometric errors among multiple second photometric information of the multiple second rays are determined. The second photometric information are the photometric information of those points that are located on the second rays and intersect with the background of the proxy model. A background rendering quality corresponding to the virtual viewpoint is obtained based on the multiple second photometric errors corresponding to the multiple second rays. Determining the rendering quality information of the proxy model at the virtual viewpoint based on the viewing angle similarities and the resolution similarities corresponding to the multiple surface points includes determining the rendering quality information corresponding to the virtual viewpoint based on the background rendering quality, the viewing angle similarities and the resolution similarities corresponding to the multiple surface points.

The rays are emitted from the viewpoints for imaging. The first rays are emitted from the virtual viewpoint, and the second rays are emitted from the acquisition viewpoints. The second photometric information are the photometric information of those pixels that are located on the second rays and intersect with the background of the proxy model. The background rendering quality represents the accuracy of the colors of the pixels in the background rendered using the first rays.

Specifically, the photometric error is a first photometric error, and the multiple photometric information are multiple first photometric information. The server determines multiple first rays that are emitted from the virtual viewpoint and do not intersect with the proxy model. For the first rays, the server determines second rays emitted from each of the multiple acquisition viewpoints. The second rays are parallel to the first rays and do not intersect with the proxy model. The server determines second photometric errors among multiple second photometric information of the multiple second rays. The server obtains the background rendering quality corresponding to the virtual viewpoint based on the multiple second photometric errors corresponding to the multiple second rays. The server determines the rendering quality information corresponding to the virtual viewpoint based on the background rendering quality, the viewing angle similarities and resolution similarities corresponding to the multiple surface points.

For example, for a first ray r emitted from the virtual viewpoint $v_t$ that does not intersect with the proxy model, the server may emit second rays that are parallel to the first ray and do not intersect with the proxy model from the visible acquisition viewpoints, and takes multiple second rays as a set of background rays $\Omega(r)$. The server can define the background rendering quality B(r) based on the photometric errors corresponding to the second rays. The specific equation is as follows:

$$B(r) = \begin{cases} 1 - \dfrac{\sum_{r_i, r_j \in \Omega(r), i \neq j,} \| c(v_i, r_i) - c(v_j, r_j) \|_2}{|\Omega(r)| \cdot (|\Omega(r)| - 1) \cdot 0.5}, & |\Omega(r)| > 1 \\ \beta, & |\Omega(r)| = 1 \\ 0, & |\Omega(r)| = 0 \end{cases}$$

where $v_i$ represent the virtual viewpoint, $v_j$ represents the acquisition viewpoints, $r_i$ represents the second rays in the set $\Omega(r)$, $c(v_i, r_i)$ represents the photometric information obtained by using the second rays at the virtual viewpoint, and $c(v_j, r_j)$ represents the photometric information obtained by using the second rays at the acquisition viewpoints. The photometric errors are normalized by the number of pairs of rays $|\Omega(r)| \cdot (|\Omega(r)| - 1) \cdot 0.5$. In the case that there is only one second ray, $\beta$ can be set to 0.5 to indicate that the obtained background rendering quality B(r) is not necessarily reliable. Similarly, B(r) is set to 0 in the case that there is no second ray.

In some embodiments, for the virtual viewpoint $v_t$, the server projects a ray $r \in R$ from the optical center of the virtual viewpoint $v_t$ to the proxy model, and then determines whether the ray r intersects with the proxy model. The server can recode all the rays emitted from the virtual viewpoint $v_t$ that intersect the proxy model as a set $R_f$, and recode the corresponding intersection points as a set P. The points in the set P are surface points. The server determines the rendering quality information corresponding to the virtual viewpoint based on the background rendering quality, and the corresponding prediction equation is as follows:

$$R(v_t) = \frac{\sum_{p \in P} F(v_t, p) + \sum_{r \in R - R_f} B(r)}{|R|}$$

where R $(v_t)$ represents the rendering quality information, $F(v_t, p)$ represents an evaluation item of a foreground surface point p, referred to as a foreground item. The foreground item predicts the degree to which the color of the surface point p can be recovered. B(r) represents a pixel evaluation item, referred to as a background item. The background item predicts the accuracy of the color of the synthesized pixels corresponding to the ray r.

In some embodiments, the specific equation of $F(v_t, p)$ is as follows:

$$F(v_t, p) = \begin{cases} h_{geo}(V^p) \cdot h_{ang}((V^p, v_t) \cdot h_{res}(V^p, v_t), & V^p \neq \emptyset \\ 0, & V^p = \emptyset \end{cases}$$

where $h_{geo}$ represents the reconstructibility of the point p, and $h_{ang}$ and $h_{res}$, respectively represent the viewing angle similarity and the resolution similarity between the visible acquisition viewpoint and the virtual viewpoint with respect to the point p. The value of the foreground term $F(v_t, p)$ is 0 for a point p that is not seen from any visible acquisition viewpoint. $h_{ang}$ is equal to 1 if the number of the visible acquisition viewpoints is less than 2, so that $F(v_t, p)$ is completely dependent on $h_{ang}$ $((V^p, V_t)$ and $h_{res}(V^p, v_t)$.

In these embodiments, the rendering quality information is determined according to the background rendering quality, the viewing angle similarities, and the resolution similarities, which further improves the comprehensiveness of rendering quality information prediction.

In some embodiments, before obtaining the multiple surface points of the proxy model within the viewpoint range of the virtual viewpoint, the method further includes determining a start point and an end point of an acquisition path of a virtual camera and a rendering quality threshold, and selecting a virtual viewpoint based on multiple path points between the start point and the end point. After determining the rendering quality corresponding to the virtual viewpoint based on the viewing angle similarities and the resolution similarities corresponding to the multiple surface points, the method further includes the following step: reselecting, if the rendering quality is less than the rendering quality threshold, a new virtual viewpoint and repeating the step of obtaining multiple surface points on the proxy model within the viewpoint range of the virtual viewpoint and subsequent steps until the distance between the selected virtual viewpoint and the end point satisfies an ending condition.

Specifically, before obtaining the multiple surface points of the proxy model within the viewpoint range of the virtual viewpoint, the server determines the start point and the end point of the acquisition path of the virtual camera and the rendering quality threshold, and selects the virtual viewpoint based on the multiple path points between the start point and the end point. After obtaining the rendering quality information of the virtual viewpoint, the server evaluates the rendering quality information. If the rendering quality is less than the rendering quality threshold, the server reselects a new virtual viewpoint and repeat the step of obtaining multiple surface points on the proxy model within the viewpoint range of the virtual viewpoint and subsequent steps until the distance between the selected virtual viewpoint and the end point satisfies the ending condition. It can be understood that the path generated based on the rendering quality threshold makes the rendering quality of the virtual viewing angles along the path higher than the rendering quality threshold, thereby meeting the rendering quality requirements.

In some embodiments, the server determines the path points from the start point to the end point based on a path planning algorithm of Rapid-exploration Random Tree, and determines viewing angles corresponding to the path points, so as to determine the position information of the virtual viewpoints according to the path points, and determine the orientation information of the virtual viewpoints according to the viewing angles. The rendering quality information of the virtual viewpoints is used to select the virtual viewpoints, so as to perform rendering according to the selected virtual viewpoints to obtain a high-quality video, improving the effectiveness of rendering path planning.

In some embodiments, during the process of determining the viewing angles corresponding to the path points, the server divides the yaw angle of the previous path point of the current path point into multiple regions. For each region, the server samples to obtain the yaw angles to be selected, and selects the pitch angle at or below the horizontal plane. The server generates multiple candidate viewing angles based on multiple yaw angles and pitch angles. The server generates multiple candidate virtual viewpoints based on a path point and multiple candidate viewing angles. The server performs a selection according to the rendering quality information of the multiple candidate virtual viewpoints, so as to take the selected viewing angle used by the virtual viewpoint as the viewing angle corresponding to the path point.

Specifically, in the execution of the path planning algorithm of Rapid-exploration Random Tree, the server uses the starting point as a root node to expand a tree in three-dimensional space. The branches of the tree randomly expand to fill the space. In order to ensure the rendering quality of all viewpoints along the path, the virtual viewpoints are sampled by position and orientation interpolation on each small segment of the tree, and the rendering quality information at the virtual viewpoints is predicted through the present method, so as to ensure that the frames captured at the virtual viewpoints meet a preset minimum rendering quality, i.e., the renderability values of the corresponding camera poses are all above a preset threshold. It can be understood that the quality of the rendered video obtained by such an optimized path planning algorithm is higher than that obtained by the traditional method.

Specifically, the optimized path planning algorithm of Rapid-exploration Random Tree will continuously iterate the following steps.

(1) A path point $w_j$ to be selected is determined. A point $p_c$ is sampled in a space region of the 3D scene that does not intersect with the proxy model. It can be understood that the point $p_c$ may be replaced with the position of the destination path point $w_{dest}$ with a certain probability. The path point $w_i$ that is closest to the point $p_c$ is searched among all the path points. A path segment $e_{ij}$ with a length of l is extended from the coordinate point ci of the path point $w_i$ toward the point $p_c$, and the coordinate $c_j$ of the new path point $w_j$ to be selected is obtained. The length l is specified by a user to control the spacing between the path points. If the path segment $e_{ij}$ intersects with the proxy model, the current $c_j$ is discarded, and the sampling process is performed again.

(2) The orientation of the viewing angle of $w_j$ is sampled. In order to control the orientation of the sampling viewing angle of wj and the degree of change of the $w_i$, that is, to constrain the stability of the viewing angle, the server can evenly divide the orientation of the viewing angle into four regions according to the yaw angle $\phi_i$ of $w_i$, and perform a sample in each region, as shown in FIG. 4. The size of the area range is a set scalar value $\Delta\phi_{max}$, which determines the maximum difference in yaw angles between adjacent path points. In each region, an angle is randomly sampled as the yaw angle to be selected for $w_j$. Since the positions of the sampled path points are typically above the scene, the pitch angles can be sampled in the range of 0° to −90°, i.e., the viewing angles at or below the horizontal plane are considered. Since the rendering quality field is a five-dimensional field, in the condition that the roll angle of the virtual viewpoint is fixed at 0, the server can calculate four candidate orientations of $w_j$ by combining the previous sampled yaw angles and pitch angles, thus forming four candidate viewing angles. Then, the server calculates the corresponding rendering quality information for each candidate viewing angle and selects the viewing angles whose rendering quality information is higher than the rendering quality threshold $R_{min}$. If there is no such viewing angle, the position of the path point $w_j$ is resampled.

(3) In the case that the pose parameters of $w_i$ and $w_j$ are known, the server interpolates the positions and orientations of intermediate virtual viewpoints on the path segment $e_{ij}$ to form a continuous virtual viewpoint path. In order to ensure that the rendering quality on the path segment meets the requirements, the server samples the virtual viewpoints on the $e_{ij}$, and calculates the rendering quality at these virtual viewpoints. The $w_j$ and $e_{ij}$ are retained only when the rendering qualities of all sampled virtual viewpoints are greater than the rendering quality threshold Ruin. The sampling rate can be manually adjusted to balance performance and rendering quality according to individual needs.

The above loop terminates when the distance between the new path point $w_j$ and the destination path point $w_{dest}$ is less than a preset length iciest (for example, set to 1.5 times of the length of the path segment 1). The $w_j$ and $w_{dest}$ are connected, and the intermediate virtual viewpoints are interpolated. After the above algorithm is executed, all the path points and intermediate virtual viewpoints form a tree structure, in which the branch from the root node to the $w_{dest}$ node is a complete virtual viewpoint path. Rendering along this complete virtual viewpoint path can produce an image that meets the rendering quality requirements.

In these embodiments, during the process of selecting the virtual viewpoints from the path points, the virtual viewpoints are further selected according to the rendering quality information, thereby generating multiple virtual viewpoints with high rendering quality information to generate the rendering path. Therefore, the rendering quality along the rendering path is improved, ensuring that the video results rendered along the planned rendering path have the least visual artifacts and the highest resolution.

In some embodiments, referring to the foregoing embodiments, FIG. 5 shows a schematic diagram of the principle of path planning guided by rendering quality. Specifically, the server uses the optimized path planning algorithm to sample the positions of the path points and the orientations of the viewing angles to obtain the virtual viewpoints including the position and orientation information. The position and orientation of the intermediate virtual viewpoints are interpolated on the path segment to form the continuous virtual viewpoint path. For these virtual viewpoints, the server evaluates the foreground item F ($v_r$, p) and the background item B(r), calculates the rendering quality information, selects the virtual viewpoints based on the rendering quality information, and renders the video according to the selected virtual viewpoints.

Figure 6:
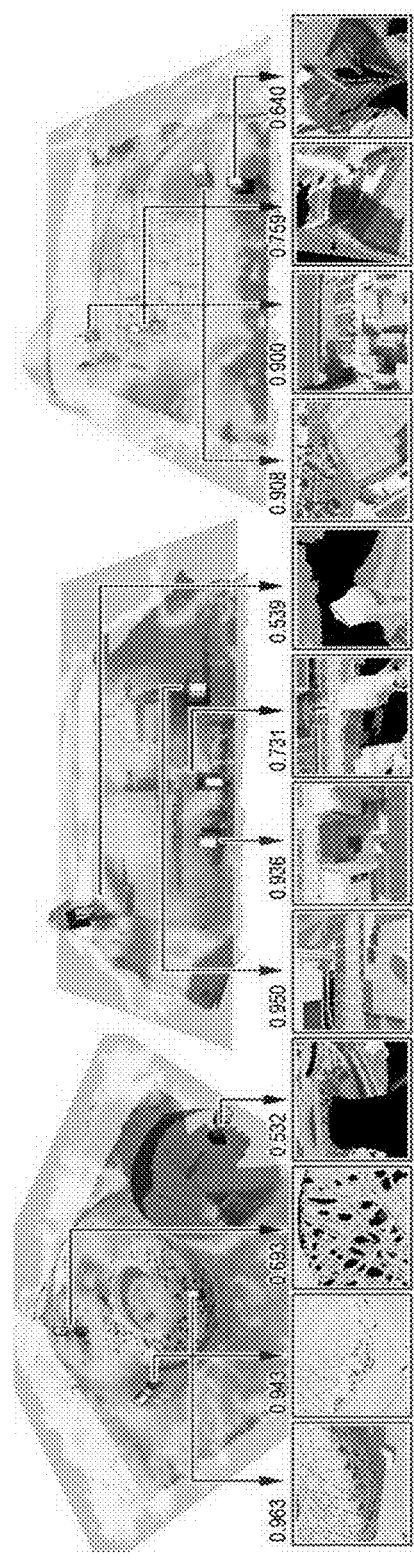
FIG. 6 is an effect schematic diagram of a method of image rendering quality prediction and path planning for large-scale scenes according to an embodiment.

FIG. 6 shows qualitative results of the method of image rendering quality prediction and path planning for large-scale scenes provided in the present disclosure. The numbers in FIG. 6 represent the rendering quality information. A set of rendering quality fields is visualized in each of the three virtual scenes. Two sets of virtual viewpoints are sampled in each of the areas with particularly high rendering quality values (light areas) and particularly low rendering quality values (dark areas). From the distribution of the rendering quality fields and the rendering results at the sampling viewpoints, it can be seen that the rendering results at the virtual viewpoints with high rendering quality have higher integrity and less visual imperfections, while the rendering results at the virtual viewpoints with low rendering quality have noticeable holes or low texture resolution.

Figure 7:
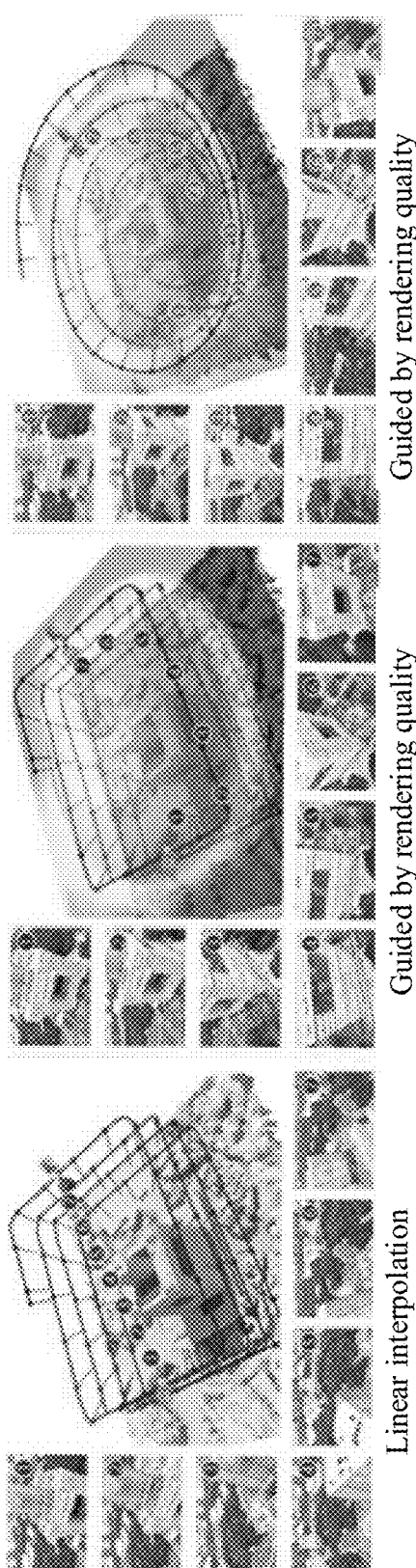
FIG. 7 is an effect schematic diagram of a method of image rendering quality prediction and path planning for large-scale scenes according to an embodiment.

FIG. 7 shows a comparison between a path planned by the path planning method guided by the rendering quality and a path planned by a linear interpolation method. The server sets the same start path point and end path point for the two navigation methods, and adopts the same virtual viewpoint interpolation strategy. The rendering quality threshold $R_{min}$ is set to 0.9. It can be seen that although the length of the path generated under the guidance of the rendering quality is longer, it always maintains high rendering quality along the path, resulting in the final rendered image has a high sense of reality. On the other hand, the linear path only has higher rendering quality at the beginning and the end, with imperfections such as holes, flicker, and artifacts in the middle of the rendering result. This comparison result effectively demonstrates that the rendering quality has a significant impact on rendering results in navigation applications. The right side of FIG. 7 shows a path planned by the present method at another set of acquisition viewpoints. It can be seen that the planned path changes when the acquisition viewpoint is altered.

In order to quantitatively evaluate the prediction accuracy of the rendering quality information $R(v_t)$ to the rendering quality, in the present disclosure, the Spearman's rank correlation coefficient rs between the rendering quality information and Peak Signal-to-Noise Ratio (PSNR), as well as between the rendering quality information and Structural Similarity Index (SSIM), is calculated, respectively. The Spearman's rank correlation coefficient can represent the monotonic relationship between two variables. The higher the value of rs, the higher the correlation between R and these two image quality evaluation indicators (i.e., PSNR and SSIM), indicating that the rendering quality information can predict the rendering quality more accurately. In addition to the correlation between R and PSNR, as well as between R and SSIM, the value of the Spearman's rank correlation coefficient rs between the two rendering quality evaluation indicators (i.e., PSNR and SSIM) is also calculated as a reference for comparison. After experiments, the rendering quality information has extremely high correlations in the three test scenes, the highest correlations with PSNR are 93.9%, 95.1%, 95.7%, respectively, while the highest correlations with SSIM are 84.6%, 96.4%, 97.3%, all of which are higher than the correlation between PSNR and SSIM. These results prove that the present method can achieve a quality evaluation performance similar to that of traditional reconstruction quality evaluation indicators that require reference images, but without the need for reference images.

The rendering quality information prediction indexes provided in this application are related to the method of viewing angle-dependent texture mapping, which requires a proxy model for performing intersection and reprojection calculations between the lighting and the model. For image-based rendering methods that require other types of geometric knowledge, it is also possible to design rendering quality prediction schemes that are specific to a particular rendering method or more general. The rendering quality information is a novel indicator for predicting rendering quality. The heuristic rendering quality provided in the present disclosure is only used as an implementation solution, and this concept can be applied to other rendering methods.

It should be understood that, although the steps in the flowcharts involved in part embodiments of the present disclosure are sequentially shown by the indications of the arrows, these steps are not necessarily executed in the order indicated by the arrows. Unless explicitly stated herein, the execution of these steps is not strictly limited to the order, and the steps may be executed in other orders. Moreover, at least a part of the steps in the flowcharts may include multiple steps or multiple stages, and these steps or stages are not necessarily executed and completed at the same time, but may be performed at different times. The execution order of these steps or stages is not necessarily sequential, but may be performed alternately or in turn with other steps or at least a part of the steps or stages of the other steps.

Based on the same concept, some embodiments of the present disclosure also provide a system of image rendering quality prediction and path planning for large-scale scenes for implementing the above method of image rendering quality prediction and path planning for large-scale scenes. The solution to the problem provided by the system is similar to that described in the above method, therefore, the specific limitations in one or more embodiments of the system of image rendering quality prediction and path planning for large-scale scenes provided below can be referred to the limitations of the method of image rendering quality prediction and path planning for large-scale scenes above and will not be repeated here.

Figure 8:
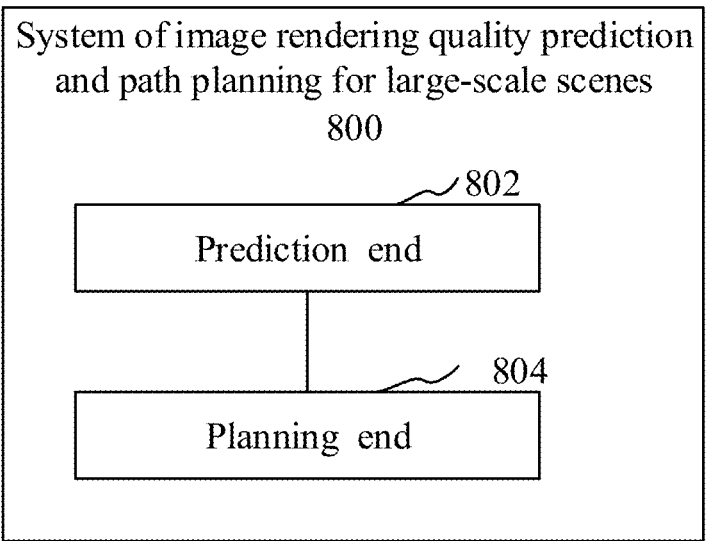
FIG. 8 is a structure block diagram of a system of image rendering quality prediction and path planning for large-scale scenes according to an embodiment.

In some embodiments, as shown in FIG. 8, a system of image rendering quality prediction and path planning for large-scale scenes 800 is provided. The system 800 includes a prediction end 802 and a planning end 804.

The prediction end 802 is configured to obtain multiple surface points of a proxy model within the viewpoint range of a virtual viewpoint. The proxy model is a virtual object obtained by acquiring images of a real object from multiple acquisition viewpoints. For each surface point, a photometric error among multiple photometric information corresponding to the surface point is determined. The multiple photometric information refers to the photometric information of the surface points at multiple visible acquisition viewpoints, respectively. The visible acquisition viewpoints refer to those acquisition viewpoints where the surface point is visible among multiple acquisition viewpoints.

The prediction end 802 is further configured to determine a viewing angle similarity and a resolution similarity between the virtual viewpoint and the visible acquisition viewpoints with respect to the surface point based on the photometric error.

The prediction end 802 is further configured to determine a rendering quality information of the proxy model at the virtual viewpoint based on the viewing angle similarities and resolution similarities corresponding to the multiple surface points.

In some embodiments, the multiple photometric information are multiple first photometric information, and the photometric error is a first photometric error. The prediction end 802 is also configured to determine multiple of first rays emitting from the virtual viewpoint, and the first rays do not intersect with the proxy model. For the first rays, second light rays emitted by each of the multiple acquisition viewpoints are determined. The second rays are parallel to the first light rays and do not intersect with the proxy model. Second photometric errors among multiple second photometric information of the multiple second rays are determined. The second photometric information are the photometric information of the points located on the second rays and intersect with the background of the proxy model. The background rendering quality corresponding to the virtual viewpoint is obtained based on the multiple second photometric errors corresponding to the multiple second rays. The prediction end 802 is also configured to determine the rendering quality information corresponding to the virtual viewpoint based on the background rendering quality, the viewing angle similarities and the resolution similarities corresponding to the multiple surface points.

In some embodiments, the prediction end 802 is also configured to determine the angle information between the virtual viewpoint and each visible acquisition viewpoint with respect to the surface point, determine the distance information of the virtual viewpoint and each visible acquisition viewpoint with respect to the surface point, determine the viewing angle similarity between the virtual viewpoint and the visible acquisition viewpoints with respect to the surface point based on the photometric error and the angle information, and determine the resolution similarity between the virtual viewpoint and the visible acquisition viewpoints with respect to the surface point based on the photometric error and the distance information.

In some embodiments, the prediction end 802 is also configured to determine a virtual ray between the virtual viewpoint and the surface point, determine an acquisition ray between the visible acquisition viewpoint and the surface point, and determine the value of the angle between the virtual ray and the acquisition ray as the angle information between the virtual viewpoint and the visible acquisition viewpoint with respect to the surface point.

In some embodiments, the prediction end 802 is also configured to determine a virtual distance between the virtual viewpoint and the surface point, determine an acquisition distance between the visible acquisition viewpoint and the surface point, and determine the distance information between the virtual viewpoint and the visible acquisition viewpoint with respect to the surface point based on a ratio of the distance difference between the virtual distance and the acquisition distance to the acquisition distance.

In some embodiments, the prediction end 802 is also configured to determining the minimum angle information from the angle information corresponding to the multiple visible acquisition viewpoints, and determine the viewing angle similarity between the virtual viewpoint and the visible acquisition viewpoints with respect to the surface point based on the photometric error and the minimum angle information. In the case that the minimum angle information remains unchanged, the photometric error is negatively correlated with the viewing angle similarity.

In some embodiments, the prediction end 802 is also configured to determine the minimum distance information from the distance information corresponding to the multiple visible acquisition viewpoints, and determine the resolution similarity between the virtual viewpoint and the visible acquisition viewpoints with respect to the surface point based on the minimum distance information and the photometric error. In the case that the minimum distance information remains unchanged, the photometric error is negatively correlated with the resolution similarity.

In some embodiments, before obtaining the multiple surface points of the proxy model within the viewpoint range of the virtual viewpoint, the planning end 804 is further configured to determine a start point and an end point of an acquisition path of a virtual camera and a rendering quality threshold, and selects a virtual viewpoint from multiple path points between the start point and the end point. After determining the rendering quality corresponding to the virtual viewpoint based on the viewing angle similarities and the resolution similarities corresponding to the multiple surface points, the planning end 804 is further configured to reselect a new virtual viewpoint if the rendering quality is less than the rendering quality threshold, and repeat the step of obtaining multiple surface points on the proxy model within the viewpoint range of the virtual viewpoint and subsequent steps until the distance between the selected virtual viewpoint and the end point satisfies an ending condition.

In the above system of image rendering quality prediction and path planning for large-scale scenes, the multiple surface points of the proxy model within the viewpoint range of the virtual viewpoint are obtained. The proxy model is a virtual object obtained by acquiring images of a real object from multiple acquisition viewpoints. For each surface point, the photometric error among the multiple photometric information corresponding to the surface point is determined. The multiple photometric information refers to the photometric information of the surface points at the multiple visible acquisition viewpoints, respectively. The visible acquisition viewpoints refer to those acquisition viewpoints where the surface point is visible among multiple acquisition viewpoints. It can be understood that the photometric error can represent the degree of surface diffuse reflection of the real object corresponding to the proxy model. Based on the photometric error, the viewing angle similarity and resolution similarity between the virtual viewpoint and the visible acquisition viewpoint with respect to the surface point are determined. In this way, the viewing angle similarity and the resolution similarity can be determined according to the degree of diffuse reflection, thereby improving the accuracy of the viewing angle similarity and resolution similarity. The rendering quality information of the proxy model at the virtual viewpoint is determined based on the viewing angle similarities and the resolution similarities corresponding to the multiple surface points. In this way, the rendering quality information of the virtual viewpoint can be predicted to evaluate the virtual viewpoint, and the evaluation accuracy is improved.

The specific limitations of the above system of image rendering quality prediction and path planning for large-scale scenes can be referred to the above limitations of the method of image rendering quality prediction and path planning for large-scale scenes and will not be repeated here. The devices in the above system of image rendering quality prediction and path planning for large-scale scenes can be fully or partially implemented by software, hardware, or a combination thereof. The above devices can be embedded in or independent from a processor of a computer device in the form of hardware, and can also be stored in a memory of the computer device in the form of software, so that the processor can invoke and execute the corresponding operations of the above devices.

Figure 9:
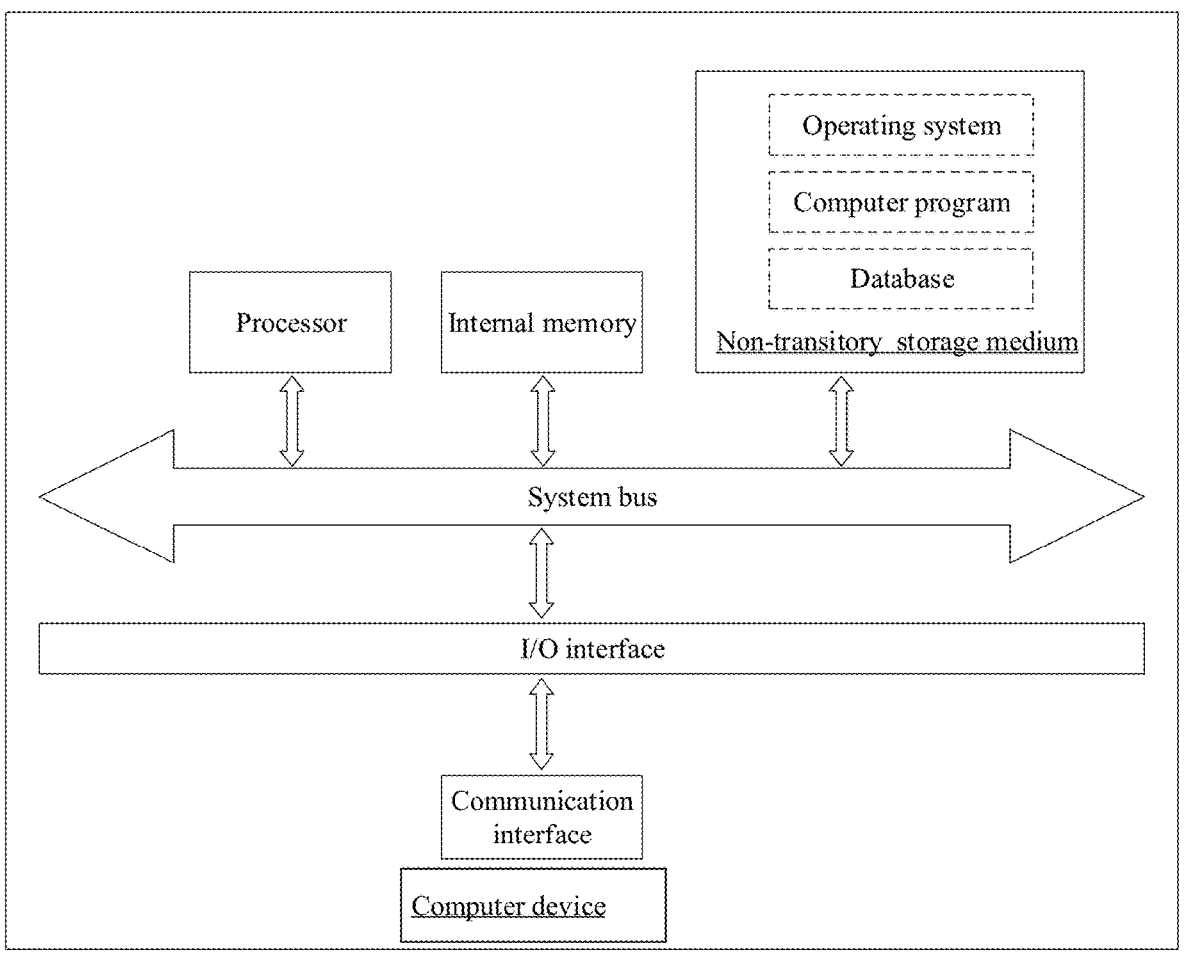
FIG. 9 is a diagram showing an internal structure of a computer device according to an embodiment.

In some embodiments, a computer device is also provided. The computer device may be a server. An inner structure of the computer device is shown in FIG. 9. The computer device includes a processor, a memory, an input/output interface (I/O, for short), and a communication interface. The processor, the memory, and the input/output interface are connected through a system bus, and the communication interface is connected to the system bus through the input/output interface. The processor of the computer device is configured to provide computing and control capabilities. The memory of the computer device includes a non-transitory storage medium and an internal memory. The non-transitory storage medium stores an operating system and computer programs. The internal memory provides an environment for the operation of the operating system and a computer program in the non-transitory storage medium. The input/output interface of the computer device is configured to exchange information between the processor and external devices. The communication interface of the computer device is configured to communicate with an external terminal through a network connection. When the computer program is executed by the processor, a method of image rendering quality prediction and path planning for large-scale scenes is implemented.

Figure 10:
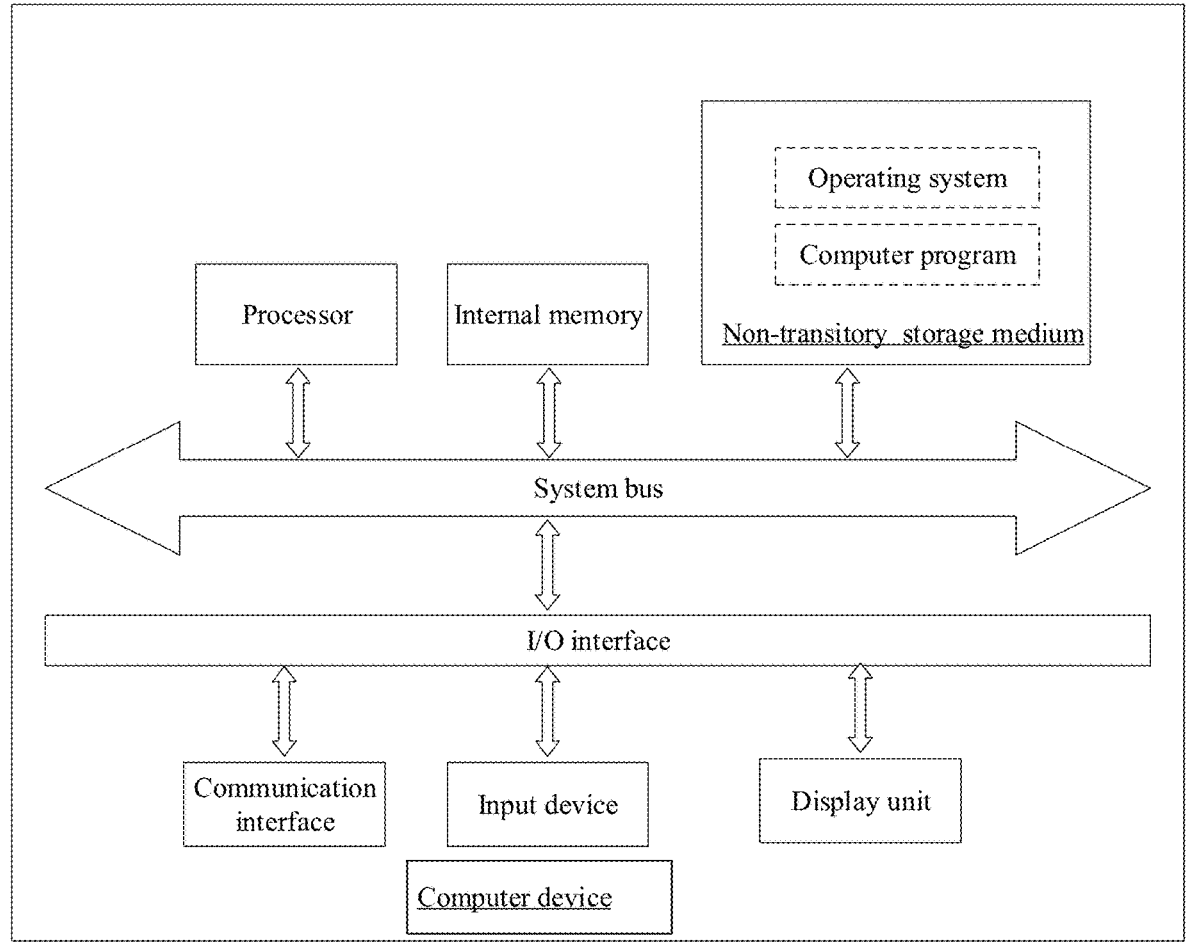
FIG. 10 is a diagram showing an internal structure of a computer device according to an embodiment.

In some embodiments, a computer device is provided. The computer device may be a terminal, an inner structure of which is shown in FIG. 10. The computer device includes a processor, a memory, an input/output interface, a communication interface, a display unit, and an input device. The processor, the memory, and the input/output interface are connected through a system bus. The communication interface, the display unit and the input device are connected to the system bus through the input/output interface. The processor of the computer device is configured to provide computing and control capabilities. The memory of the computer apparatus may include a non-transitory storage medium and an internal memory. The non-transitory storage medium stores an operating system and a computer program. The internal memory provides an environment for the operation of the operating system and the computer program in the non-transitory storage medium. The input/output interface of the computer apparatus is configured to exchange information between the processor and external devices. The communication interface of the computer apparatus is configured to be in wired or wireless communication with external terminals, and the wireless communication can be realized by Wi-Fi, mobile cellular network, near field communication (NFC) or other technologies. The computer program can be executed by the processor to implement a method of image rendering quality prediction and path planning for large-scale scenes. The display unit of the computer apparatus is configured to form a visually visible picture. The display unit may be a display screen, a projection device, or a virtual reality imaging device. The display screen may be a liquid crystal display screen or an electronic ink display screen. The input device of the computer apparatus may be a touch layer covered on the display screen, and may also be keys, trackballs or touchpads provided on a housing of the computer apparatus, and may also be an external keyboard, a touchpad, or a mouse.

Those skilled in the art should understand that the structure shown in FIG. 9 and FIG. 10 are only block diagrams of a part of the structure related to the solution of the present disclosure, and does not constitute a limitation on the computer apparatus to which the solution of the present disclosure is applied. A specific computer apparatus can include more or fewer components, combine certain components, or have a different arrangement of components than those shown in the figures.

In some embodiments, a computer device including a memory and a processor is also provided. The memory stores a computer program. When the computer program is executed by the processor, the steps of the method described in the above embodiments are implemented.

In some embodiments, a non-transitory computer readable storage medium storing a computer program is provided. When the computer program is executed by the processor, the steps of the method described in the above embodiments are implemented.

In some embodiments, a computer program product is provided. the computer program product includes a computer program. When the computer program is executed by a processor, the steps of the methods described in above embodiments are implemented.

Those of ordinary skill in the art can understand that all or part of the processes of the methods of the above embodiments may be implemented by instructing relevant hardware through a computer program. The computer program may be stored in a non-transitory computer-readable storage medium. When the computer program is executed, it can implement the processes of the above-mentioned method embodiments. Any reference to a memory, a database or other media used in the embodiments provided in the present disclosure may include at least one of a non-transitory memory and a transitory memory. The non-transitory memory may include a Read-Only Memory (ROM), a magnetic tape, a floppy disk, a flash memory, an optical memory, etc. The transitory memory may include a Random Access Memory (RAM), an external cache memory, or the like. By way of illustration and not limitation, the RAM may be in various forms, such as a Static Random Access Memory (SRAM), or a Dynamic Random Access Memory (DRAM), etc.

The above embodiments of the technical features may be carried out in any combination, in order to make the description concise, not all possible combinations of the technical features of the above embodiments are described. However, as long as the combination of these technical features do not contradict, these technical features should be considered to be within the scope of the description of this specification.

The above-mentioned embodiments only illustrate several embodiments of the present disclosure, and the descriptions thereof are relatively specific and detailed, but should not be construed as a limitation on the scope of the patent of the present disclosure. It should be noted that for those skilled in the art, without departing from the concept of the present disclosure, several modifications and improvements may be made, which all fall within the protection scope of the present disclosure. Therefore, the scope of protection of the present disclosure shall be subject to the appended claims.

What is claimed is:

1. A method of image rendering quality prediction and path planning for large-scale scenes, comprising:

obtaining multiple surface points of a proxy model within a viewpoint range of a virtual viewpoint, wherein the proxy model is a virtual object obtained by acquiring images of a real object from multiple acquisition viewpoints;

for each of the surface points, determining a photometric error among multiple photometric information corresponding to the surface point, wherein the multiple photometric information are multiple first photometric information, and the photometric error is a first photometric error, the multiple first photometric information are photometric information of the surface point at multiple visible acquisition viewpoints respectively, and the visible acquisition viewpoints are those acquisition viewpoints where the surface point is visible among the multiple acquisition viewpoints;

determining a viewing angle similarity and a resolution similarity between the virtual viewpoint and the visible acquisition viewpoints with respect to the surface point based on the first photometric error;

determining multiple first rays that are emitted from the virtual viewpoint and do not intersect with the proxy model;

determining second rays respectively emitted from the multiple acquisition viewpoints, wherein the second rays are parallel to the first rays and do not intersect with the proxy model;

determining second photometric errors among multiple second photometric information of the multiple second rays, wherein the second photometric information are the photometric information of those points that are located on the second rays and intersect with a background of the proxy model;

obtaining a background rendering quality corresponding to the virtual viewpoint based on the multiple second photometric errors corresponding to the multiple first rays; and determining a rendering quality information of the proxy model at the virtual viewpoint based on the background rendering quality, and the viewing angle similarities and the resolution similarities corresponding to the multiple surface points.

2. The method according to claim 1, wherein the determining the viewing angle similarity and the resolution similarity between the virtual viewpoint and the visible acquisition viewpoints with respect to the surface point based on the first photometric error comprises:

determining angle information between the virtual viewpoint and each visible acquisition viewpoint with respect to the surface point;

determining distance information of the virtual viewpoint and each visible acquisition viewpoint with respect to the surface point;

determining the viewing angle similarity between the virtual viewpoint and the visible acquisition viewpoints with respect to the surface point based on the first photometric error and the angle information; and determining the resolution similarity between the virtual viewpoint and the visible acquisition viewpoints with respect to the surface point based on the first photometric error and the distance information.

3. The method according to claim 2, wherein the determining the angle information between the virtual viewpoint and each visible acquisition viewpoint with respect to the surface point comprises:

determining a virtual ray between the virtual viewpoint and the surface point;

determining an acquisition ray between the visible acquisition viewpoint and the surface point; and determining a value of an angle between the virtual ray and the acquisition as the angle information between the virtual viewpoint and the visible acquisition viewpoint with respect to the surface point.

4. The method according to claim 2, wherein the determining the distance information of the virtual viewpoint and each visible acquisition viewpoint with respect to the surface point comprises:

determining a virtual distance between the virtual viewpoint and the surface point;

determining an acquisition distance between the visible acquisition viewpoint and the surface point; and obtaining the distance information of the virtual viewpoint and the visible acquisition viewpoint with respect to the surface point based on a ratio of a distance difference between the virtual distance and the acquisition distance to the acquisition distance.

5. The method according to claim 2, wherein the determining the viewing angle similarity between the virtual viewpoint and the visible acquisition viewpoints with respect to the surface point based on the first photometric error and the angle information comprises:

determining a minimum angle information from the angle information corresponding to the multiple visible acquisition viewpoints; and determining the viewing angle similarity between the virtual viewpoint and the visible acquisition viewpoints with respect to the surface point based on the photometric error and the minimum angle information, wherein when the minimum angle information remains unchanged, the photometric error is negatively correlated with the viewing angle similarity.

6. The method according to claim 2, wherein the determining the resolution similarity between the virtual viewpoint and the visible acquisition viewpoints with respect to the surface point based on the first photometric error and the distance information comprises:

determining a minimum distance information from the distance information corresponding to the multiple visible acquisition viewpoints; and determining the resolution similarity between the virtual viewpoint and the visible acquisition viewpoints with respect to the surface point based on the minimum distance information and the first photometric error, wherein when the minimum distance information remains unchanged, the first photometric error is negatively correlated with the resolution similarity.

7. The method according to claim 1, before obtaining the multiple surface points of the proxy model within the viewpoint range of the virtual viewpoint, the method further comprising:

determining a start point and an end point of an acquisition path of a virtual camera and a rendering quality threshold; and selecting the virtual viewpoint based on multiple path points between the start point and the end point;

wherein after determining the rendering quality of the proxy model at the virtual viewpoint based on the viewing angle similarities and the resolution similarities corresponding to the multiple surface points, the method further comprises:

reselecting, if the rendering quality is less than the rendering quality threshold, a new virtual viewpoint and repeat the step of obtaining the multiple surface points on the proxy model within the viewpoint range of the virtual viewpoint and subsequent steps until a distance between a selected virtual viewpoint and the end point satisfies an ending condition.

8. A system of image rendering quality prediction and path planning for large-scale scenes, comprising a prediction end, wherein the prediction end is configured to: obtain multiple surface points of a proxy model within a viewpoint range of a virtual viewpoint, the proxy model being a virtual object obtained by acquiring images of a real object from multiple acquisition viewpoints; for each of the surface points, determine a photometric error among multiple photometric information corresponding to the surface point, wherein the multiple photometric information are multiple first photometric information, and the photometric error is a first photometric error, the multiple first photometric information being the photometric information of the surface point at multiple visible acquisition viewpoints respectively, and the visible acquisition viewpoints being those acquisition viewpoints where the surface is visible among the multiple acquisition viewpoints;

wherein the prediction end is further configured to determine a viewing angle similarity and a resolution similarity between the virtual viewpoint and the visible acquisition viewpoints with respect to the surface point based on the first photometric error;

the prediction end is further configured to: determine multiple first rays that are emitted from the virtual viewpoint and do not intersect with the proxy model; determine second rays respectively emitted from the multiple acquisition viewpoints, wherein the second rays are parallel to the first rays and do not intersect with the proxy model; determine second photometric errors among multiple second photometric information of the multiple second rays, wherein the second photometric information are the photometric information of those points that are located on the second rays and intersect with a background of the proxy model; and obtain a background rendering quality corresponding to the virtual viewpoint based on the multiple second photometric errors corresponding to the multiple first rays; and wherein the prediction end is further configured to determine a rendering quality information of the proxy model at the virtual viewpoint based on the background rendering quality, and the viewing angle similarities and the resolution similarities corresponding to the multiple surface points.

9. A computer device, comprising a memory and a processor, the memory storing a computer program, wherein when the computer program is executed by the processor, a method of image rendering quality prediction and path planning for large-scale scenes is implemented, wherein the method comprises:

obtaining multiple surface points of a proxy model within a viewpoint range of a virtual viewpoint, wherein the proxy model is a virtual object obtained by acquiring images of a real object from multiple acquisition viewpoints;

for each of the surface points, determining a photometric error among multiple photometric information corresponding to the surface point, wherein the multiple photometric information are multiple first photometric information, and the photometric error is a first photometric error, the multiple first photometric information are photometric information of the surface point at multiple visible acquisition viewpoints respectively, and the visible acquisition viewpoints are those acquisition viewpoints where the surface point is visible among the multiple acquisition viewpoints;

determining a viewing angle similarity and a resolution similarity between the virtual viewpoint and the visible acquisition viewpoints with respect to the surface point based on the photometric error;

determining multiple first rays that are emitted from the virtual viewpoint and do not intersect with the proxy model;

determining second rays respectively emitted from the multiple acquisition viewpoints, wherein the second rays are parallel to the first rays and do not intersect with the proxy model;

determining second photometric errors among multiple second photometric information of the multiple second rays, wherein the second photometric information are the photometric information of those points that are located on the second rays and intersect with a background of the proxy model;

obtaining a background rendering quality corresponding to the virtual viewpoint based on the multiple second photometric errors corresponding to the multiple first rays; and determining a rendering quality information of the proxy model at the virtual viewpoint based on the background rendering quality, and the viewing angle similarities and the resolution similarities corresponding to the multiple surface points.

10. The computer device according to claim 9, wherein the determining the viewing angle similarity and the resolution similarity between the virtual viewpoint and the visible acquisition viewpoints with respect to the surface point based on the first photometric error comprises:

determining angle information between the virtual viewpoint and each visible acquisition viewpoint with respect to the surface point;

determining distance information of the virtual viewpoint and each visible acquisition viewpoint with respect to the surface point;

determining the viewing angle similarity between the virtual viewpoint and the visible acquisition viewpoints with respect to the surface point based on the first photometric error and the angle information; and determining the resolution similarity between the virtual viewpoint and the visible acquisition viewpoints with respect to the surface point based on the first photometric error and the distance information.

11. The computer device according to claim 10, wherein the determining the angle information between the virtual viewpoint and each visible acquisition viewpoint with respect to the surface point comprises:

determining a virtual ray between the virtual viewpoint and the surface point;

determining an acquisition ray between the visible acquisition viewpoint and the surface point; and determining a value of an angle between the virtual ray and the acquisition as the angle information between the virtual viewpoint and the visible acquisition viewpoint with respect to the surface point.

12. The computer device according to claim 10, wherein the determining the distance information of the virtual viewpoint and each visible acquisition viewpoint with respect to the surface point comprises:

determining a virtual distance between the virtual viewpoint and the surface point;

determining an acquisition distance between the visible acquisition viewpoint and the surface point; and obtaining the distance information of the virtual viewpoint and the visible acquisition viewpoint with respect to the surface point based on a ratio of a distance difference between the virtual distance and the acquisition distance to the acquisition distance.

13. The computer device according to claim 10, wherein the determining the viewing angle similarity between the virtual viewpoint and the visible acquisition viewpoints with respect to the surface point based on the first photometric error and the angle information comprises:

determining a minimum angle information from the angle information corresponding to the multiple visible acquisition viewpoints; and determining the viewing angle similarity between the virtual viewpoint and the visible acquisition viewpoints with respect to the surface point based on the photometric error and the minimum angle information, wherein when the minimum angle information remains unchanged, the photometric error is negatively correlated with the viewing angle similarity.

14. The computer device according to claim 10, wherein the determining the resolution similarity between the virtual viewpoint and the visible acquisition viewpoints with respect to the surface point based on the first photometric error and the distance information comprises:

determining a minimum distance information from the distance information corresponding to the multiple visible acquisition viewpoints; and determining the resolution similarity between the virtual viewpoint and the visible acquisition viewpoints with respect to the surface point based on the minimum distance information and the first photometric error, wherein when the minimum distance information remains unchanged, the first photometric error is negatively correlated with the resolution similarity.

15. The computer device according to claim 9, before obtaining the multiple surface points of the proxy model within the viewpoint range of the virtual viewpoint, the method further comprising:

determining a start point and an end point of an acquisition path of a virtual camera and a rendering quality threshold; and selecting the virtual viewpoint based on multiple path points between the start point and the end point;

wherein after determining the rendering quality of the proxy model at the virtual viewpoint based on the viewing angle similarities and the resolution similarities corresponding to the multiple surface points, the method further comprises:

reselecting, if the rendering quality is less than the rendering quality threshold, a new virtual viewpoint and repeat the step of obtaining the multiple surface points on the proxy model within the viewpoint range of the virtual viewpoint and subsequent steps until a distance between a selected virtual viewpoint and the end point satisfies an ending condition.

* * * * *